United States Patent
Kitabayashi

(12) 
(10) Patent No.: US 6,603,606 B2
(45) Date of Patent: Aug. 5, 2003

(54) SYSTEM AND METHODS FOR POSITION-CONTROL OF LIGHT MODULATION DEVICE

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/024,134

(22) Filed: Dec. 21, 2001

(65) Prior Publication Data

US 2002/0089759 A1 Jul. 11, 2002

(30) Foreign Application Priority Data

Jan. 5, 2001 (JP) ........................................ 2001-000704

(51) Int. Cl.⁷ ............................. G02B 9/00; G02B 3/00
(52) U.S. Cl. ....................................... 359/634; 359/649
(58) Field of Search ............................... 359/634, 649, 359/291, 295, 204, 462, 561, 619; 353/335–339; 349/9; 362/268

(56) References Cited

U.S. PATENT DOCUMENTS 6,014,164 A * 1/2000 Woodgate et al. ............. 348/42
6,310,726 B1 * 10/2001 Iizuka ........................ 359/618
2002/0051279 A1 * 5/2002 Minemoto et al. .......... 359/280

* cited by examiner

Primary Examiner—Georgia Epps
Assistant Examiner—Omar Hindi
(74) Attorney, Agent, or Firm—Oliff & Berridge, PLC

(57) ABSTRACT

The present invention provides a position-control device for a light modulation device, capable of easily performing a position-control operation. A position-control device is provided with a reference projection lens built therein capable of being commonly used, the reference projection lens projecting light combined by a crossed dichroic prism and forming a projection image, and having a predetermined optical characteristic. If the position of the optical axis is aligned once when the reference projection lens was built in, it is not necessary to align the optical axes every time the positions of liquid crystal panels are controlled and the replacement of the liquid crystal panels and the crossed dichroic prism is only required, whereby the position-control operation can be easily performed.

8 Claims, 16 Drawing Sheets

[FIG. 1]
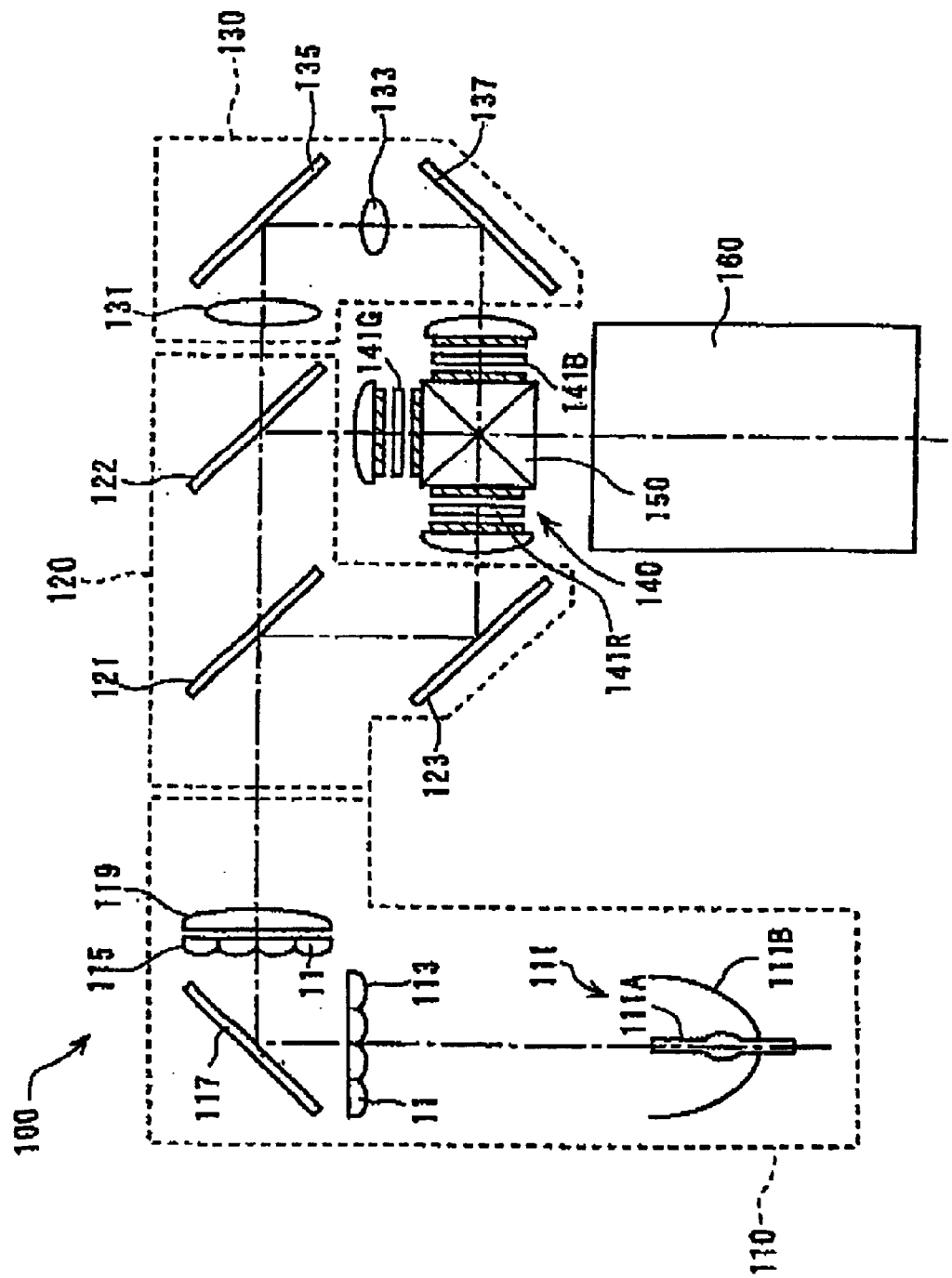

[FIG. 2]
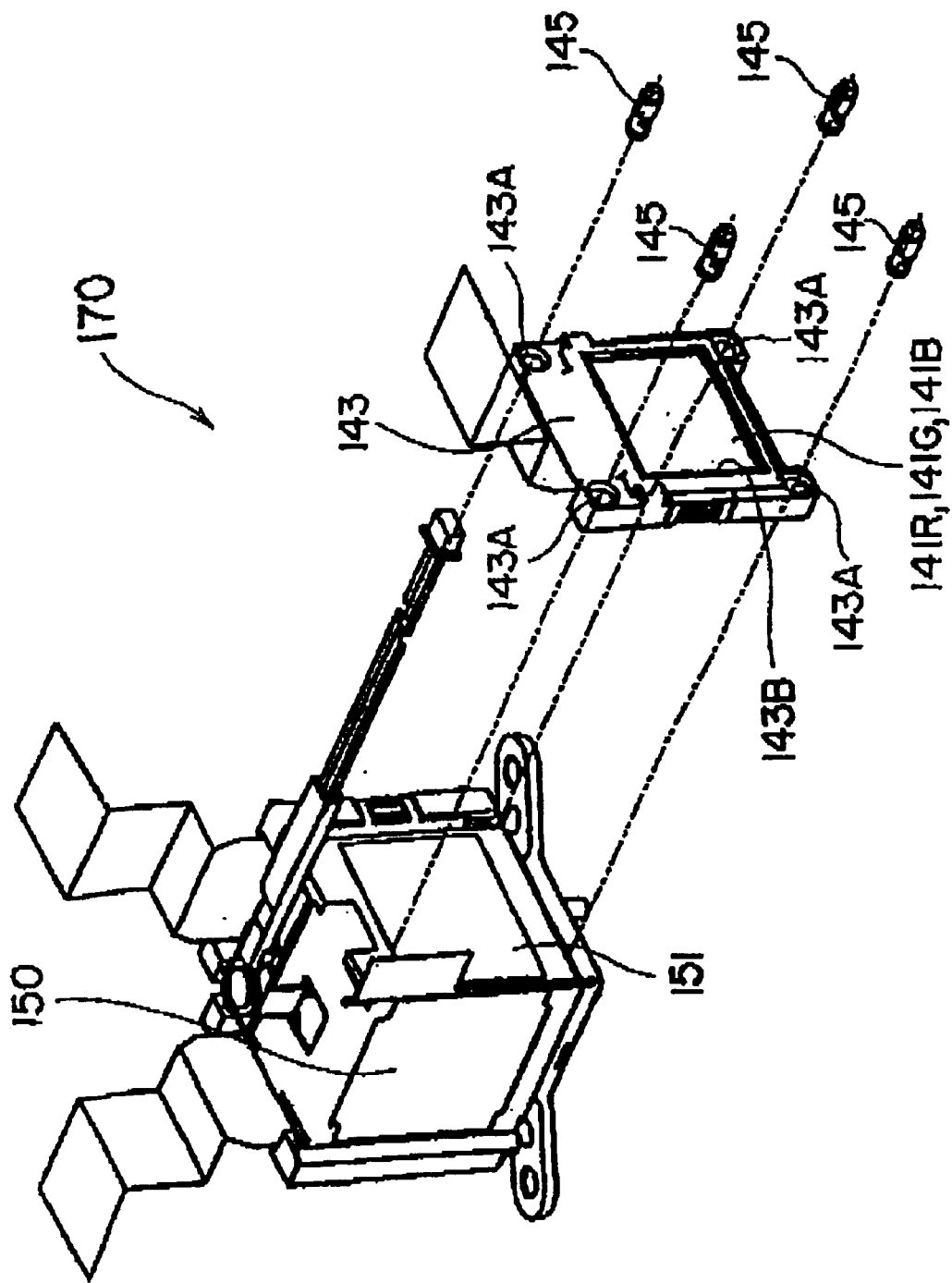

[FIG. 3]
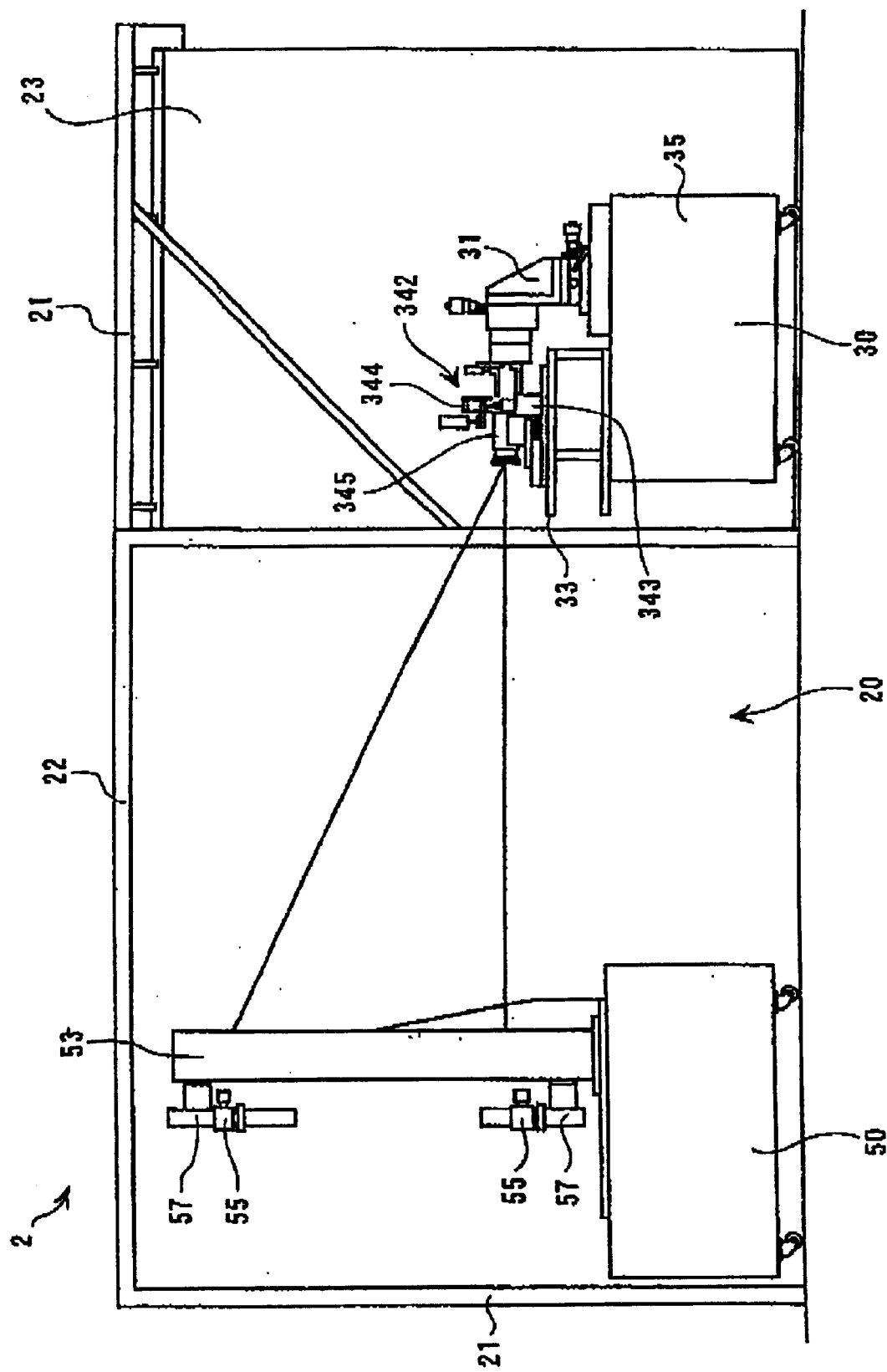

[FIG. 4]
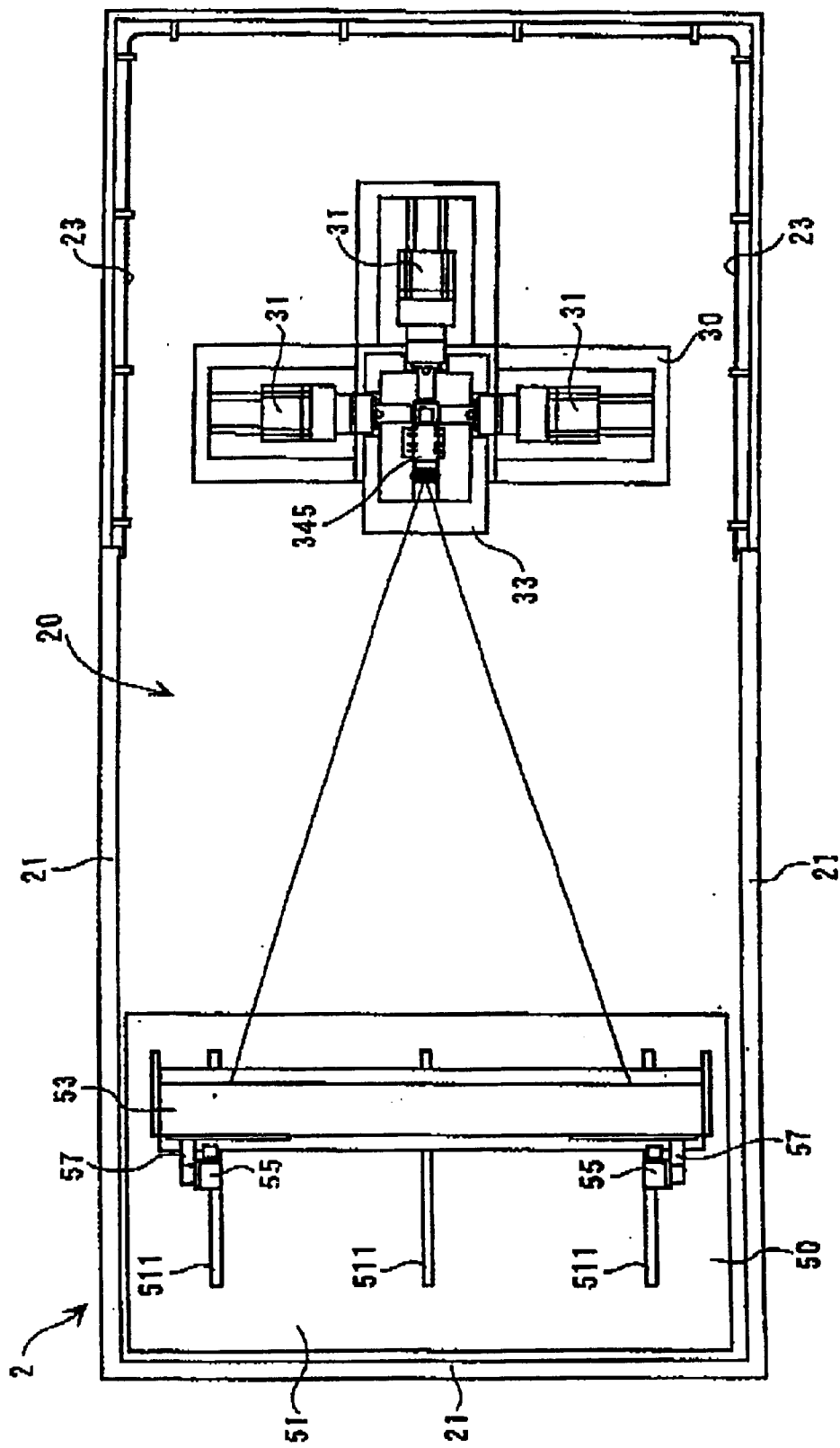

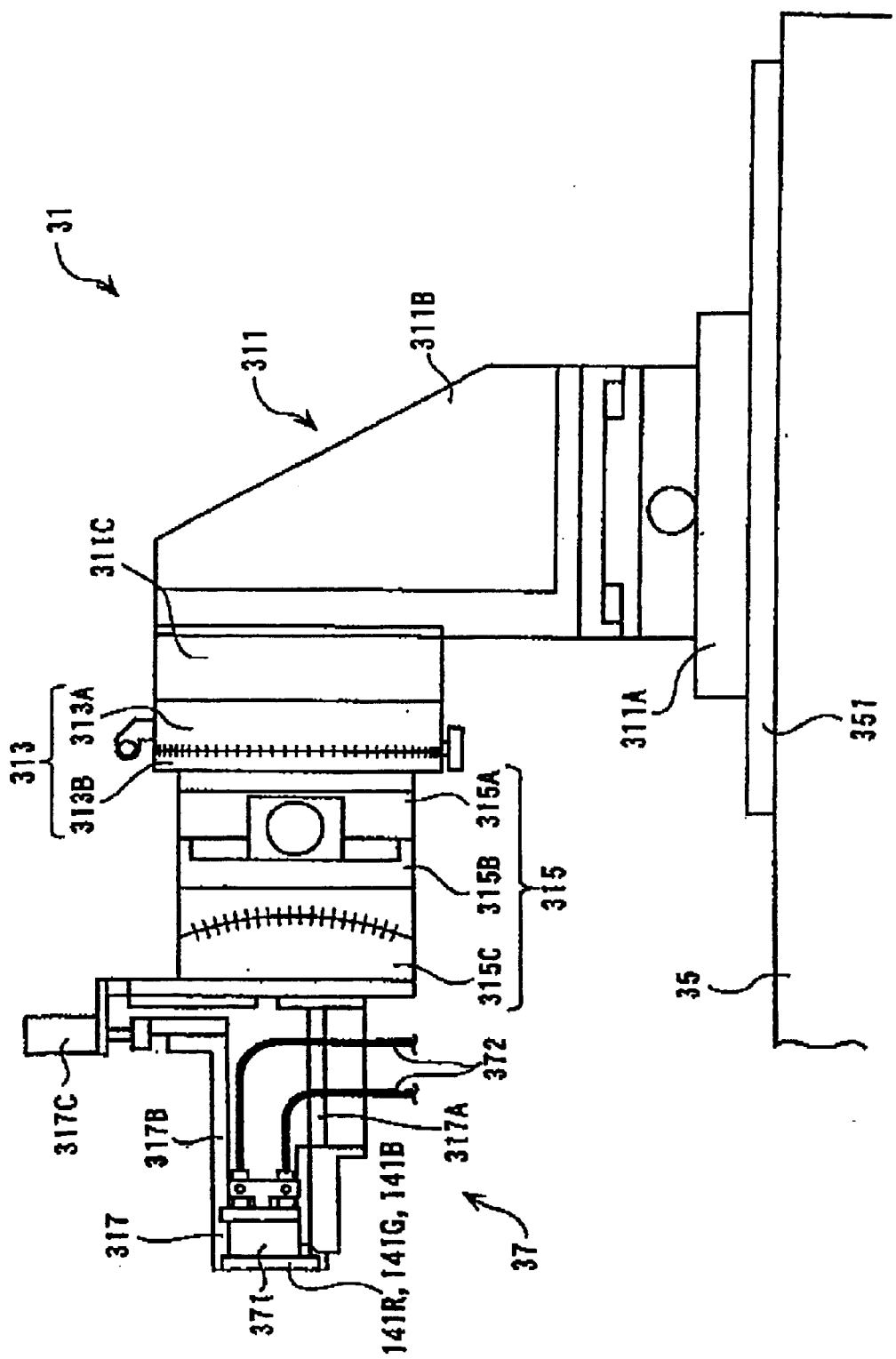
[FIG. 5]

[FIG. 6]
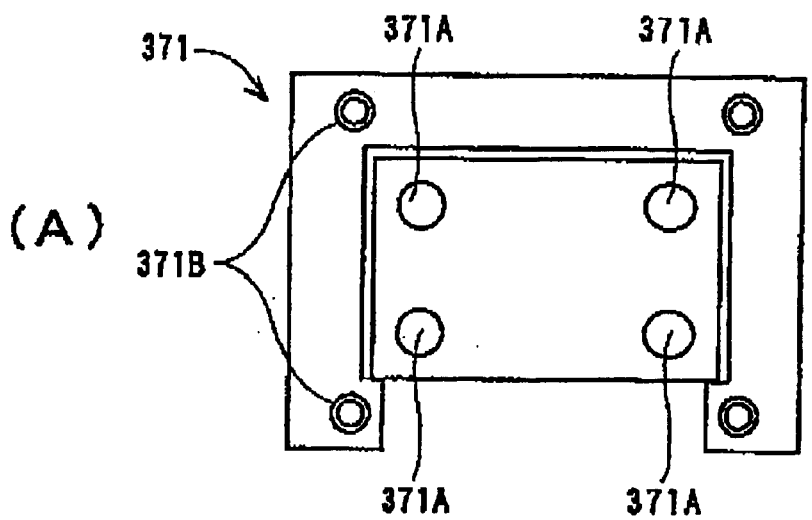
(A)
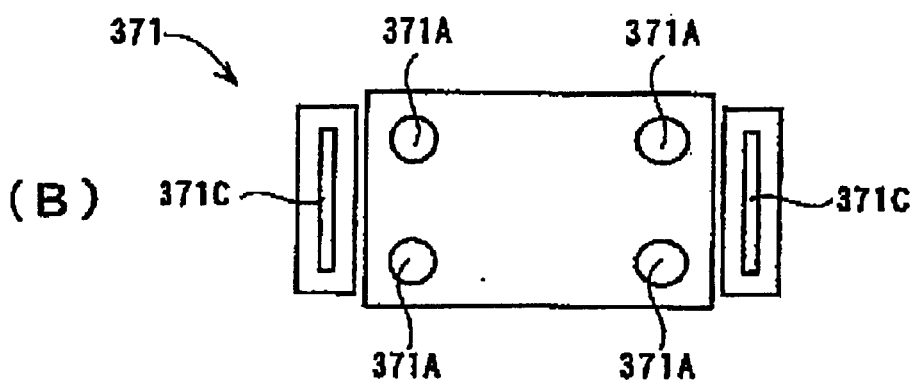
(B)
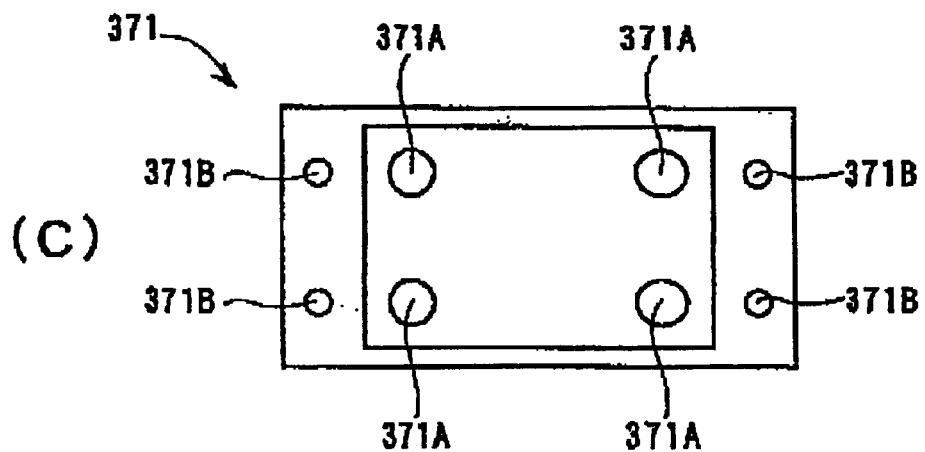
(C)

[FIG. 7]
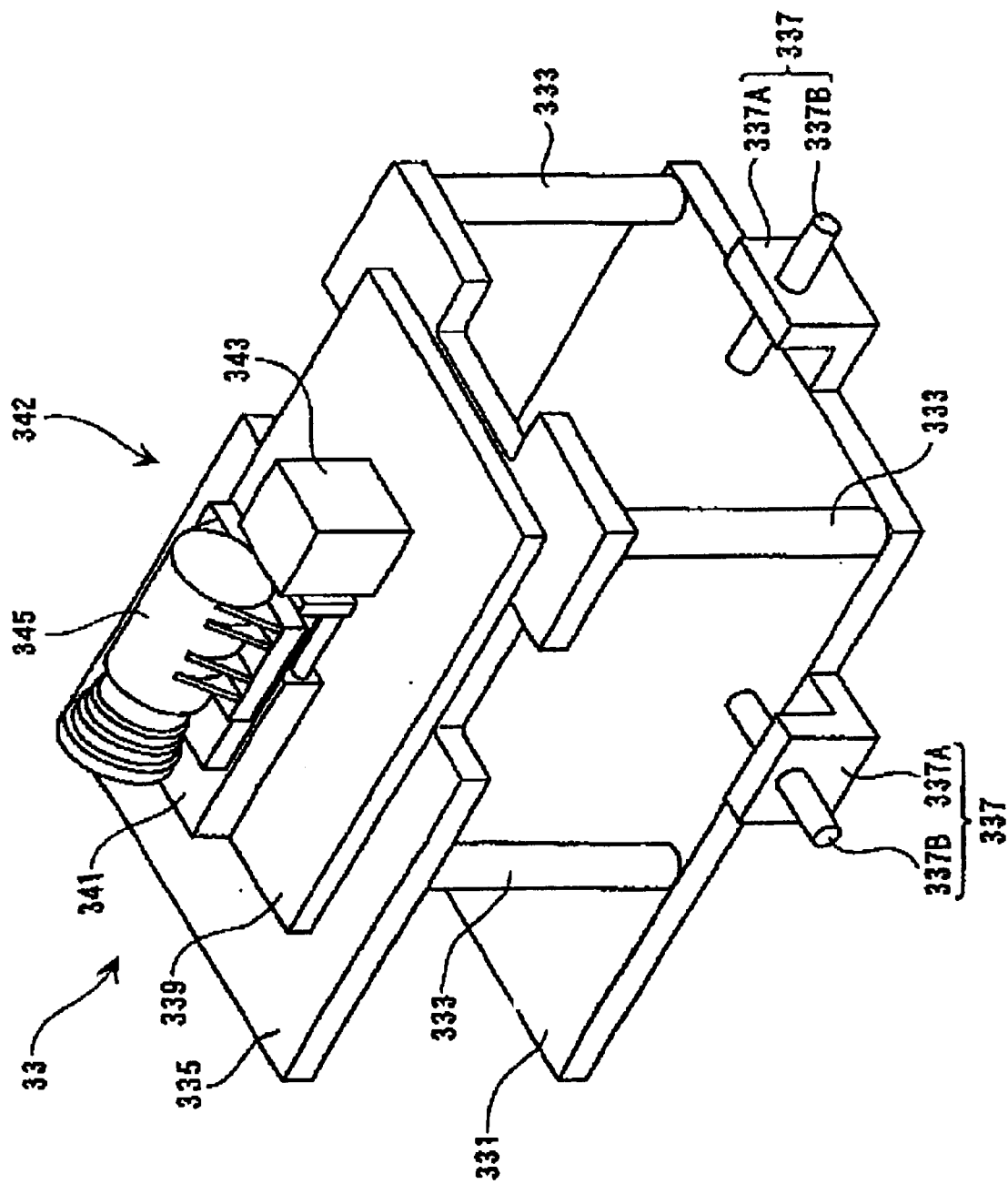

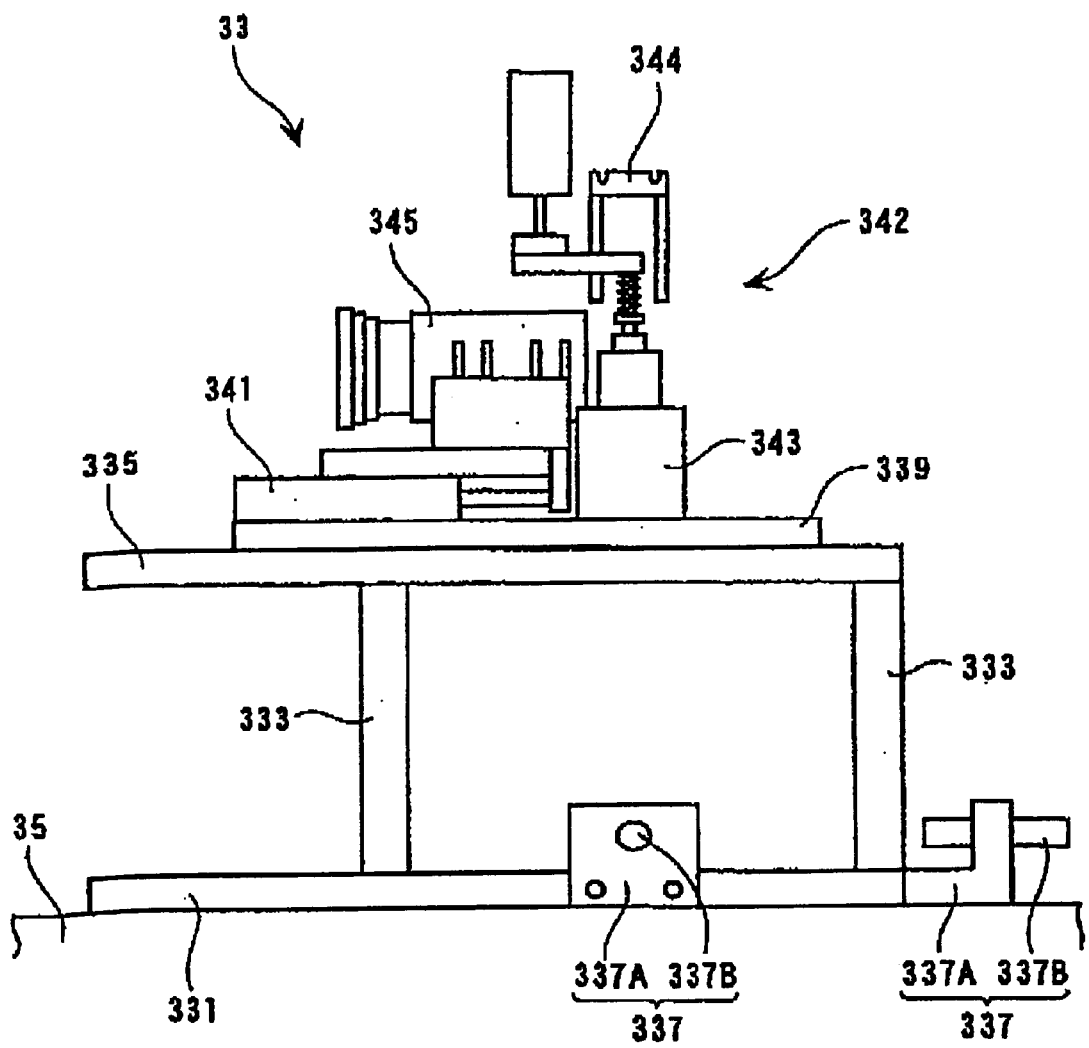
[FIG. 8]

[FIG. 9]
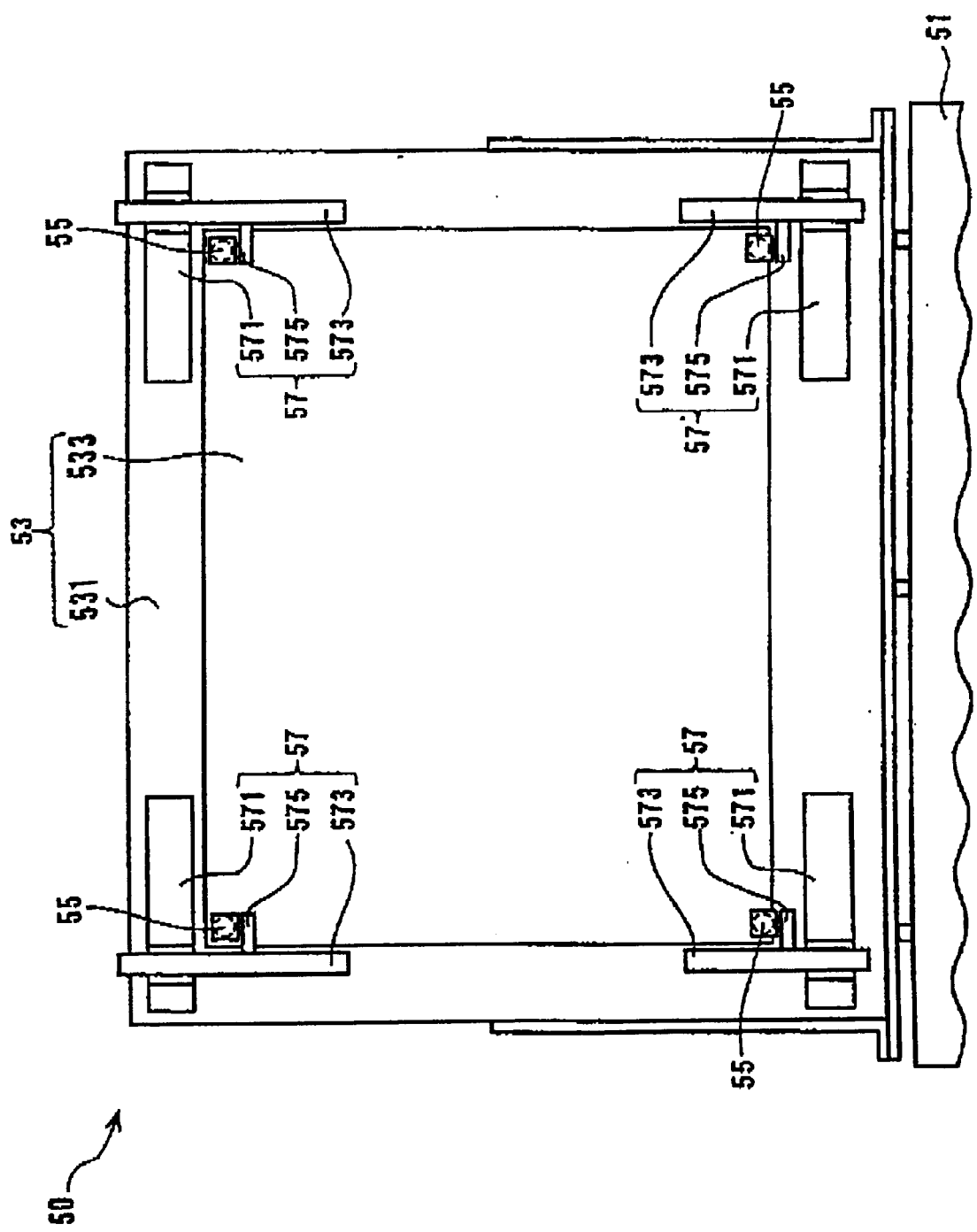

[FIG. 10]
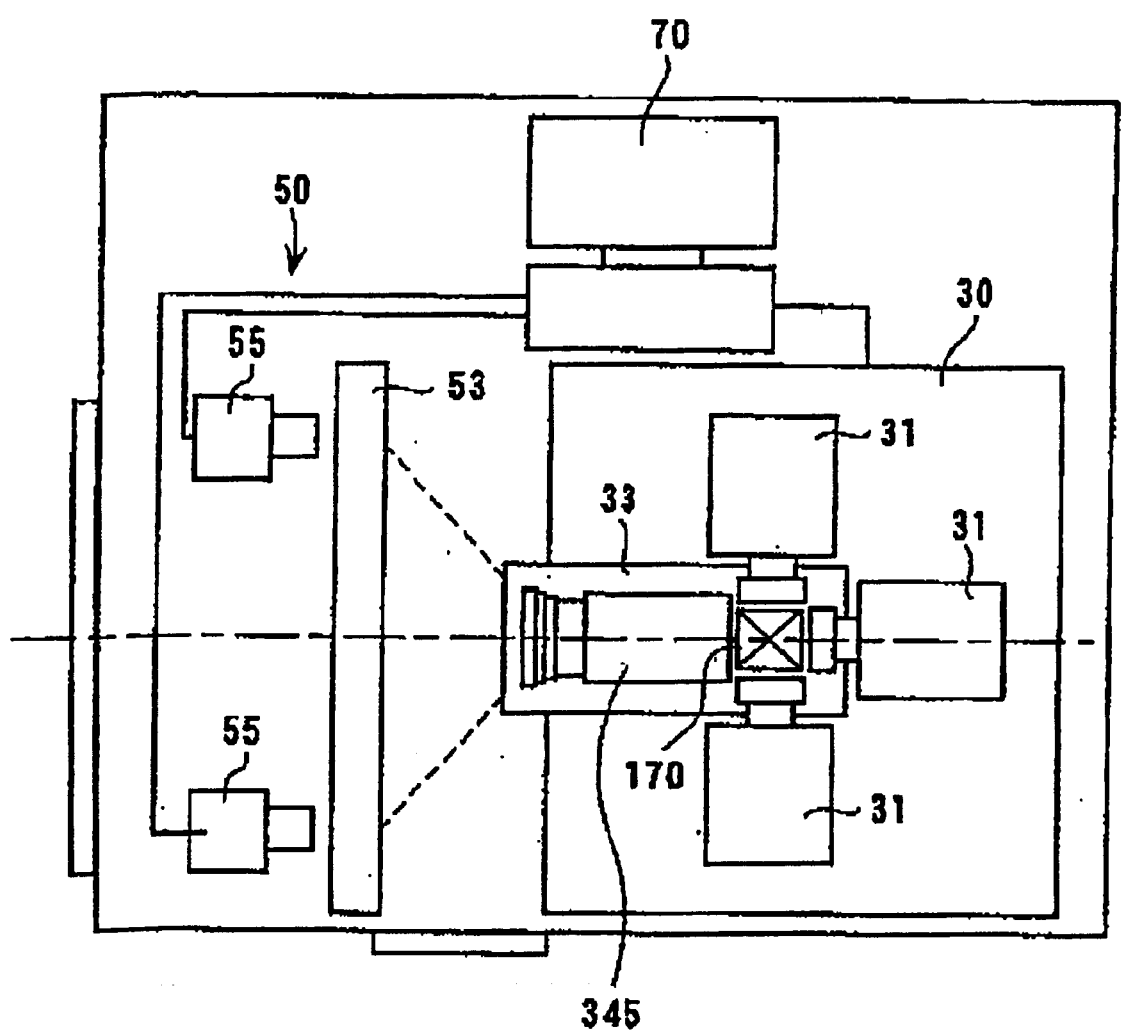

[FIG. 11]
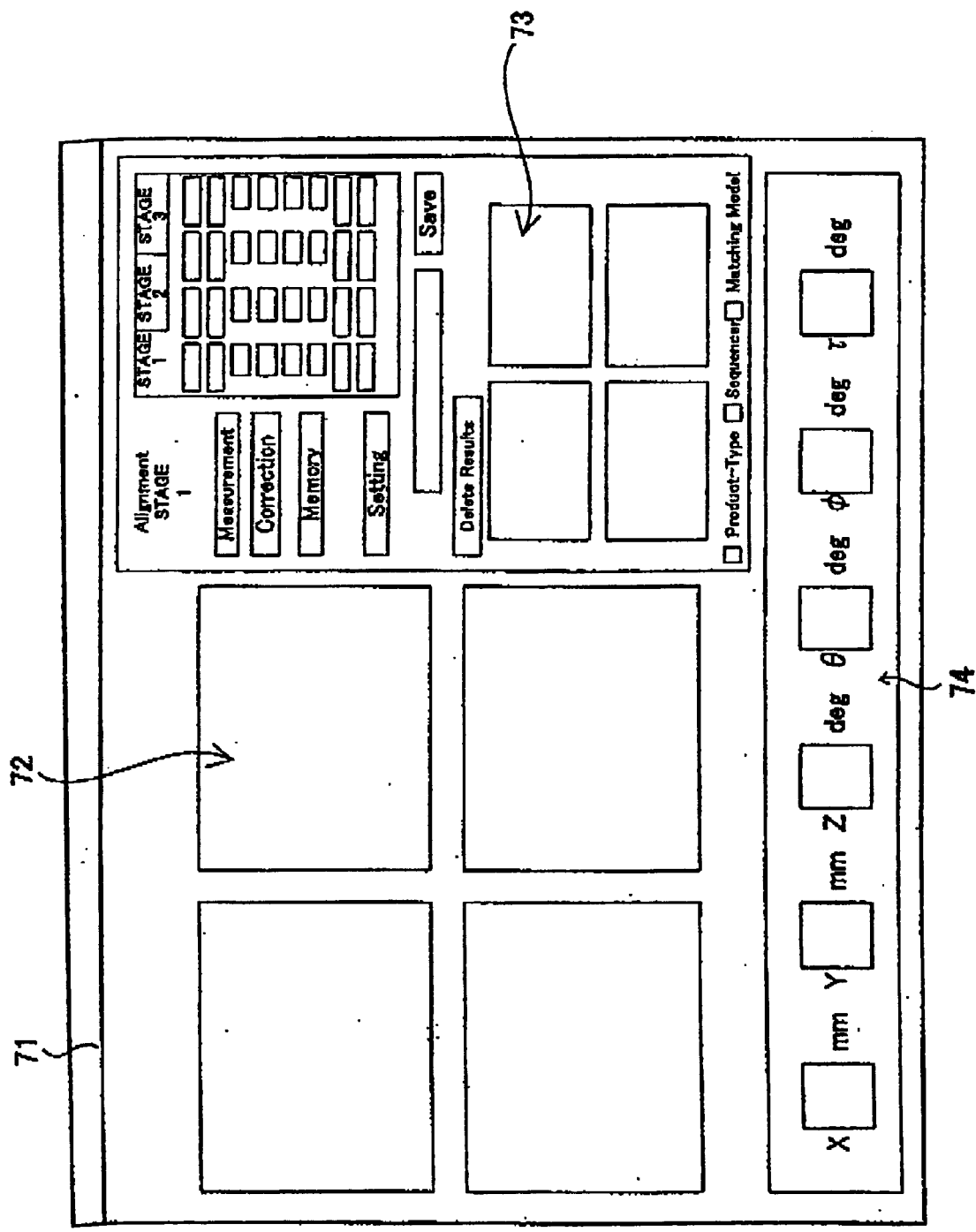

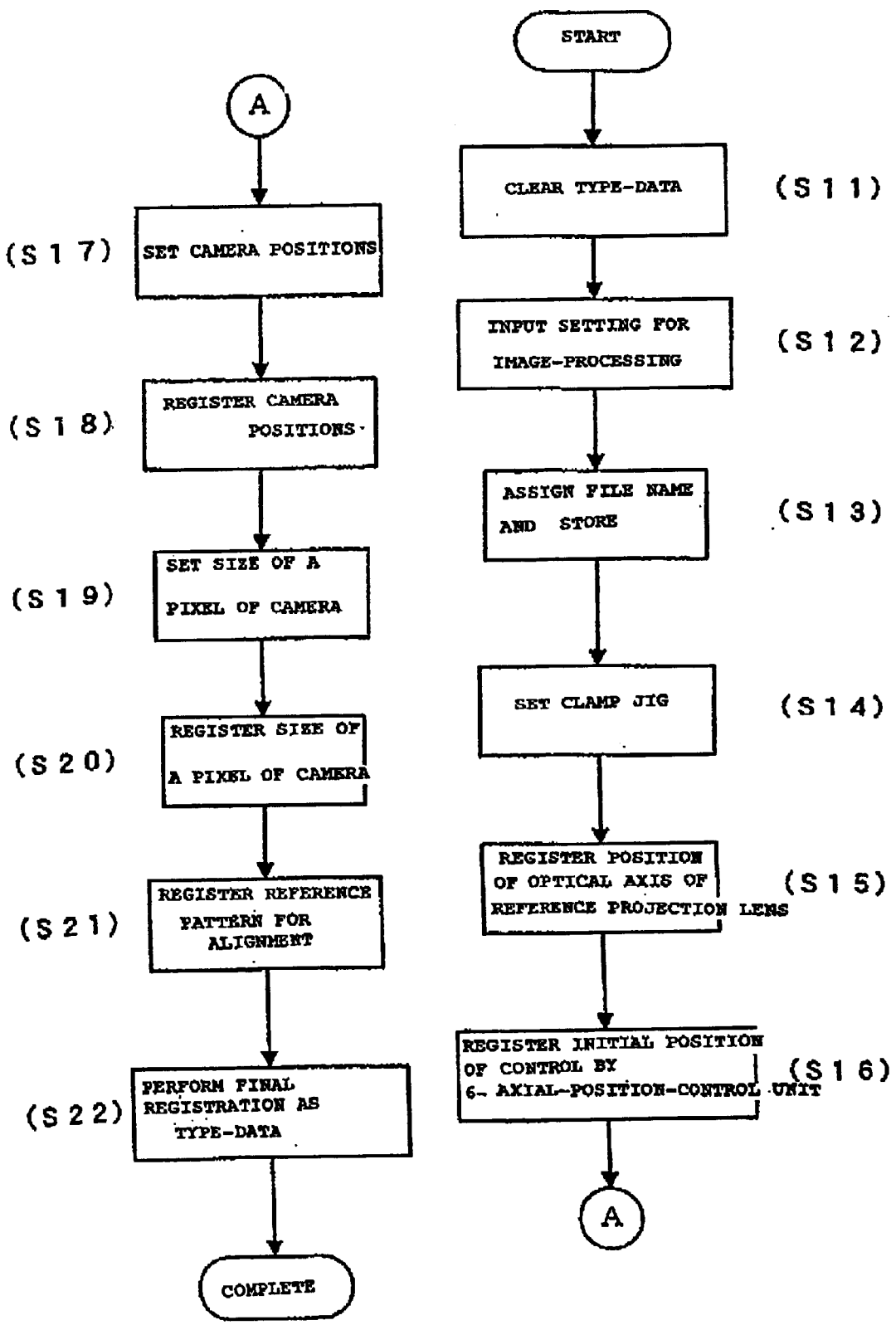
[FIG. 12]

[FIG. 13]
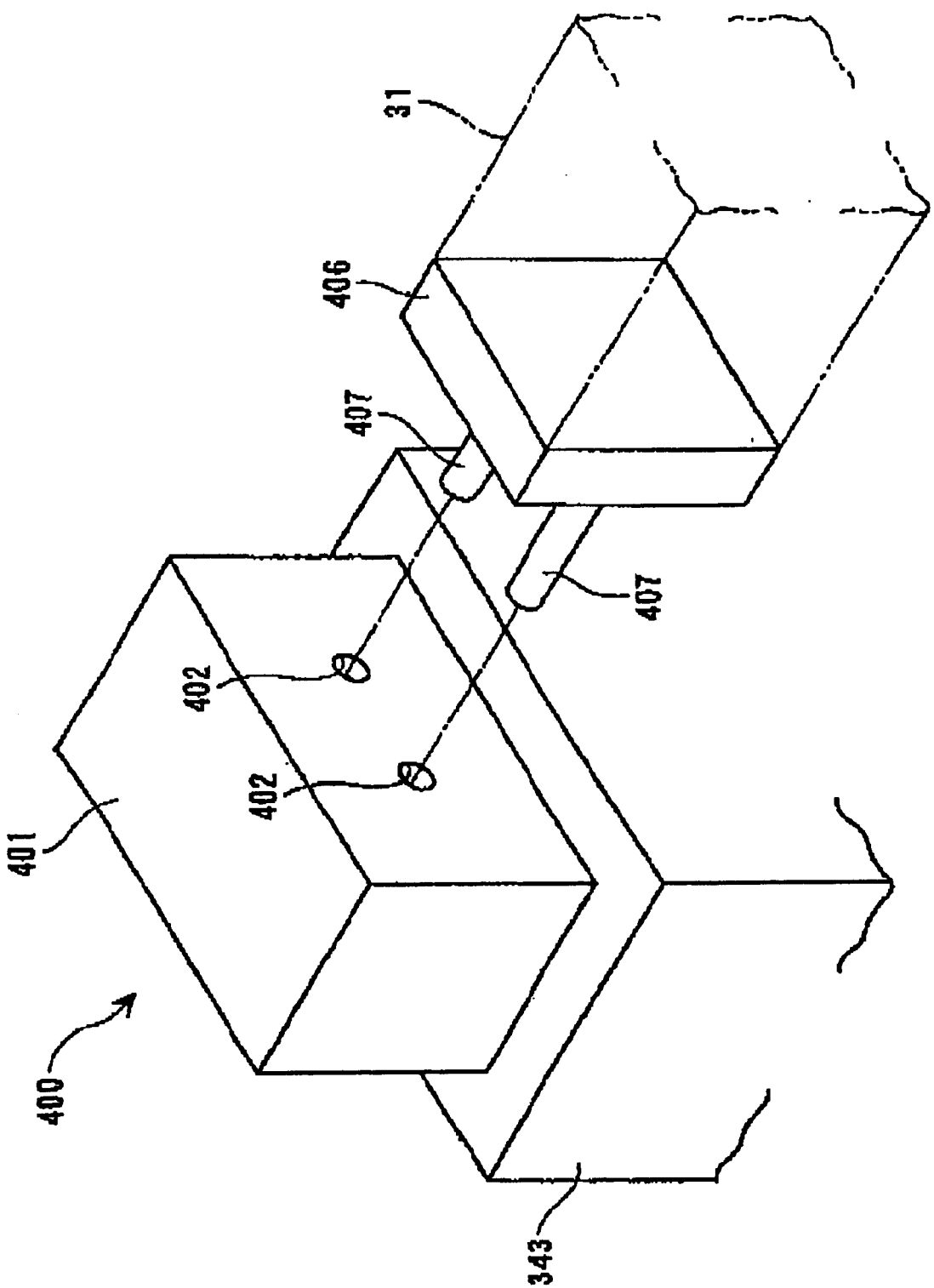

[FIG. 14]
(A)
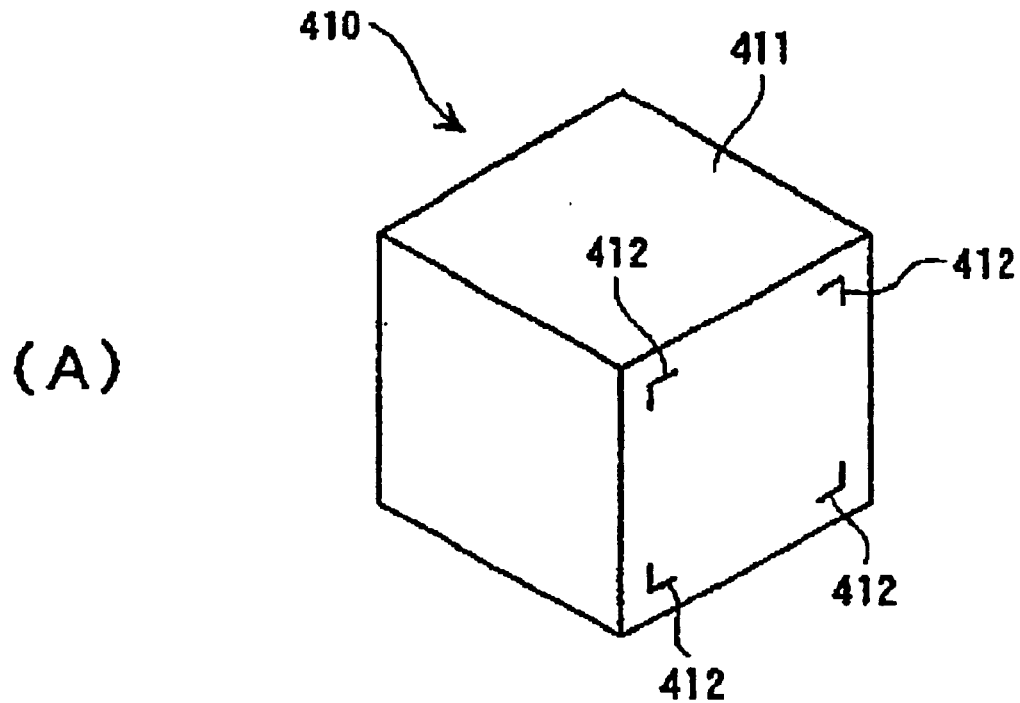
(B)
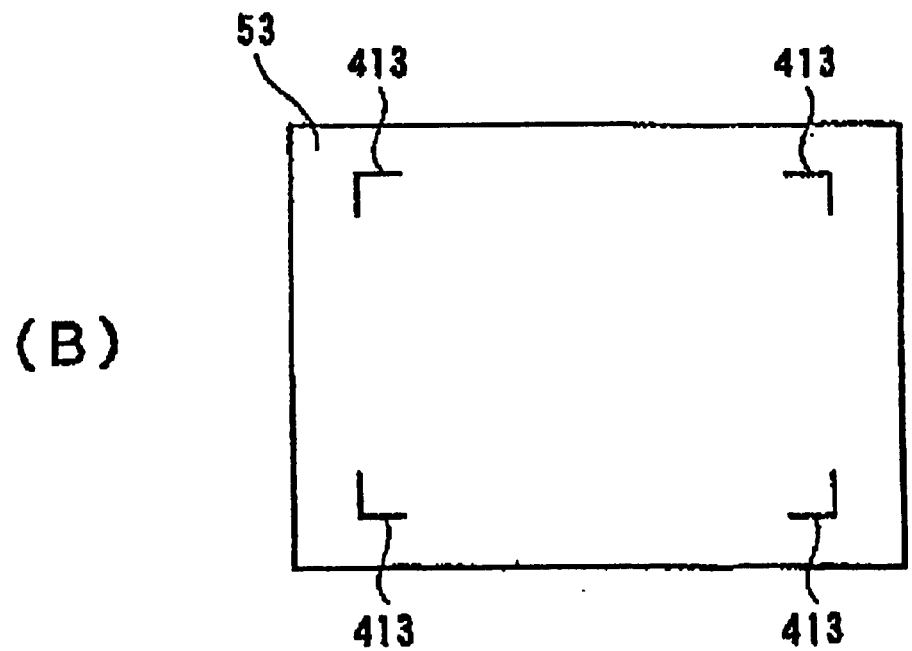

[FIG. 15]
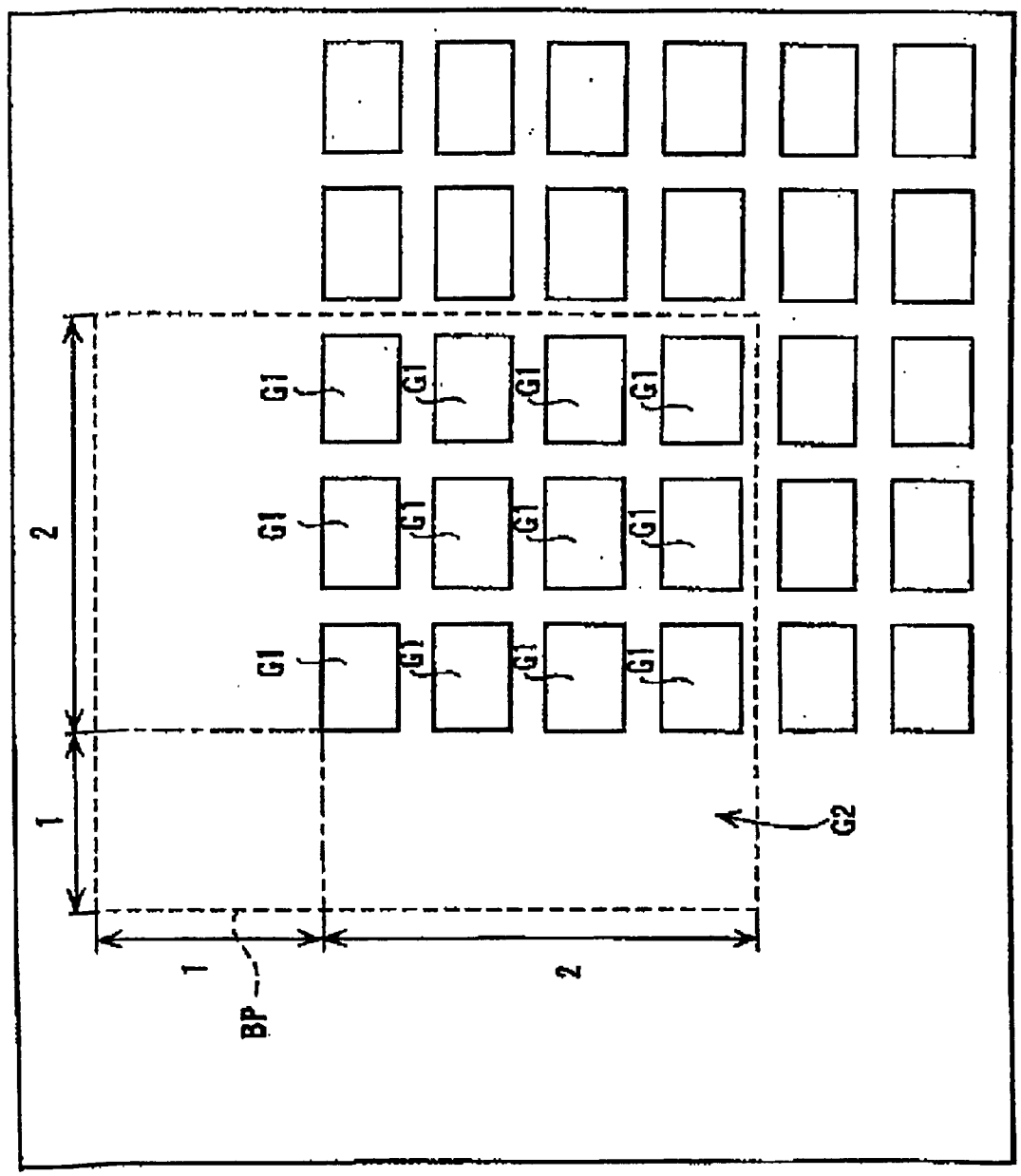

[FIG. 16]
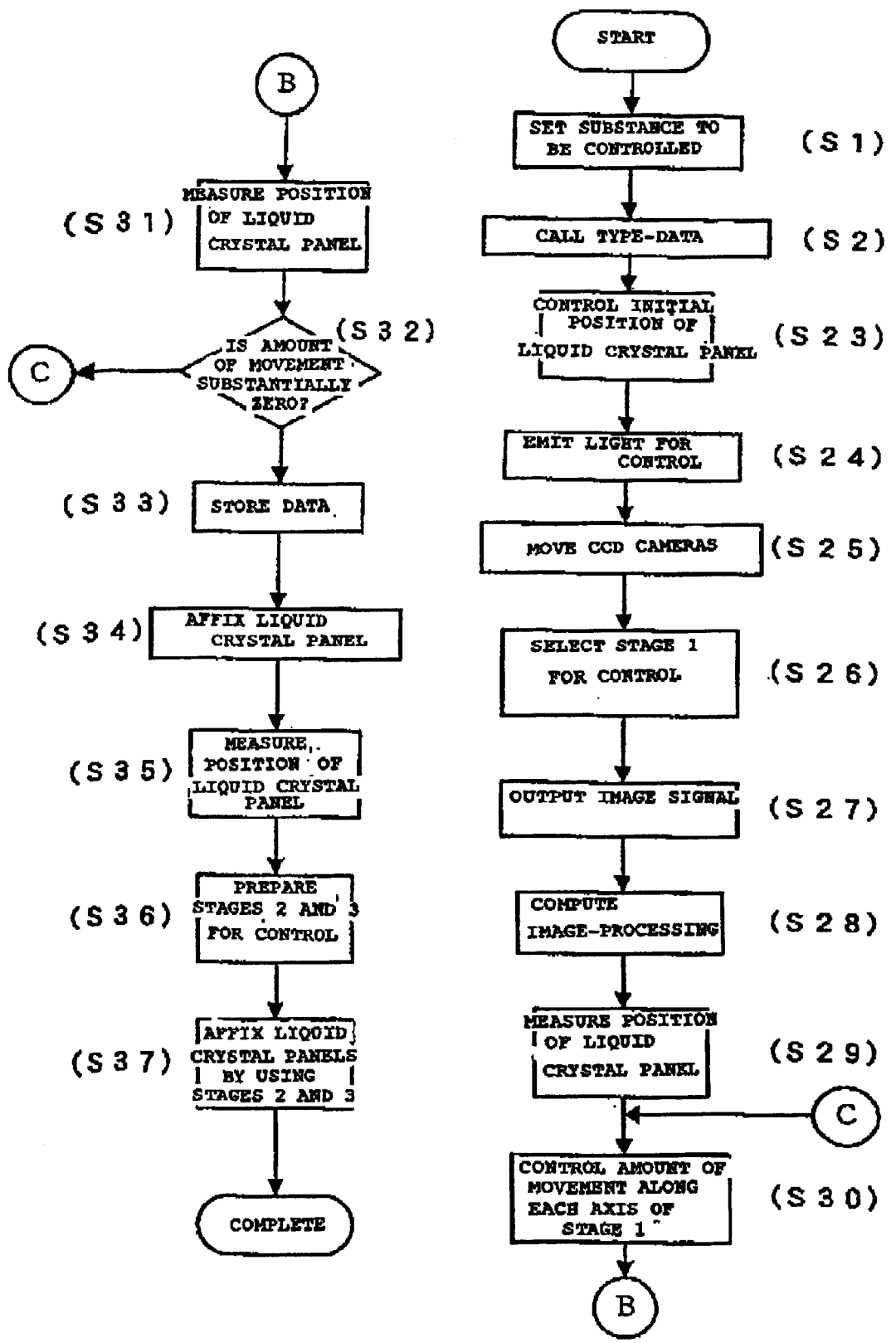

SYSTEM AND METHODS FOR POSITION-CONTROL OF LIGHT MODULATION DEVICE

BACKGROUND OF THE INVENTION

1. Field of Invention

The present invention relates to a position-control device for a light modulation device, which controls the position of the light modulation device and is used for manufacturing an optical unit including a plurality of the light modulation devices and a combining optical system for combining light modulated by each of the light modulation devices. The present invention also relates to a position-controlling method using the position-control device and an initial-position controlling jig.

2. Description of Related Art

Currently, projectors can include a plurality of light modulation devices (liquid crystal panels) that modulate separate colored light component in accordance with image data, a color-combining optical system (crossed dichroic prism) which combines colors modulated by the plurality of light modulation devices, and a projection optical system (projection lens) for projecting the light combined by the color-combining optical system for forming projection images have been used.

With such projectors, a so-called three-plate-type projector, for example, is generally known in which light emitted from a light source is decomposed into three colored light RGB by a dichroic mirror, the three colored light components are modulated in accordance with image data by three respective liquid crystal panels, the modulated light is combined by a crossed dichroic prism, and color images are projected via a projection lens.

In order to obtain a clear projection image by such a projector, the position of each liquid crystal panel must be controlled accurately when the projector is manufactured so as to avoid variations in the position of pixels between each liquid crystal panel and variations in distance from the projection lens between each liquid crystal panel. Therefore, focus control for positioning each liquid crystal panel at the position of the back focus of the projection lens and alignment control for the pixels of each liquid crystal panel to coincide with the pixels of other liquid crystal panels are performed by using a position-control device.

Currently, in a known technology, the focus and alignment control is performed in such a manner that the relative positions of the liquid crystal panels are controlled by using the position-control device with an optical unit, as the object to be controlled, which includes three liquid crystal panels, a crossed dichroic prism, and a projection lens, in which: (1) the optical unit is mounted to the position-control device and light is applied to an image-forming region of each liquid crystal panel; (2) a projection image is displayed on a screen via the crossed dichroic prism and the projection lens; (3) the light of the projection image reflected from the screen is captured by a detecting device such as a CCD camera which moves within or is fixed at a given position; and (4) the positions and the like of the focus and the pixels of each liquid crystal panel which are detected by the CCD camera are confirmed.

SUMMARY OF THE INVENTION

However, there is a problem with the above-describe systems in that the operation of position-control is laborious work in which the optical axis of the projection lens must be positioned every time the optical unit including the three liquid crystal panels, the crossed dichroic prism, and the projection lens is mounted to the position-control device, the projection lens being large compared with the other components, such as the liquid crystal panels, and the crossed dichroic prism, and thereby being difficult to handle.

The position control of the CCD camera is performed by moving the CCD camera with respect to a projection image which is actually displayed on a screen. Therefore, it can take a long time for detection and the like by the CCD camera, whereby there is a problem in that the position-control operation is laborious.

Accordingly, an object of the present invention is to provide a position-control device for a light modulation device, a position-controlling method for controlling the position of the light modulation device, and an initial-position controlling jig so that the position-control operation can be easily performed.

According to a first invention of the present application, a position-control device for a light modulation device, which is used in the manufacture of an optical unit including a plurality of the light modulation devices and a combining optical system for combining the light modulated by each light modulation device, and which controls the positions of the light modulation devices, can include a reference projection optical system which projects the light combined by the combining optical system to form a projection image and has a predetermined optical characteristic, the reference projection optical system being built in the position-control device so as to be commonly used.

In the position-control device according to the invention which is provided with the reference projection optical system built therein, it is not necessary to align the optical axes every time the position of the light modulation device is controlled, for example, when the optical axes are once aligned when building in, and only the replacement of the light modulation device and the combining optical system is required, whereby the position-control operation can be easily performed.

Since the position of the optical axis of the reference projection optical system is fixed, the positions of the detecting device and the like, for example, which detect the data of a projection image displayed on a screen via the reference projection optical system, may be fixed after setting the same, whereby the position-control operation can be easily performed.

The reference projection optical system is preferably selected from a plurality of projection optical systems and preferably has an average optical characteristic.

In this case, the optical characteristic can include a depth of focus, individual focal distances of the projection optical systems, a chromatic aberration, variations in the optical axes, trapezoidal distortion, and the like. An average optical characteristic can be computed from the optical characteristic of each projection optical system, and a projection optical system having an optical characteristic similar to the computed optical characteristic is used as the reference projection optical system.

When a projection optical system having a very large depth of focus is used as the reference projection optical system or a projection optical system having a very small depth of focus is used as the reference projection optical system when controlling the position of the light modulation device, the projection optical system to be prepared when manufacturing a projector must be a particular projection optical system which has a depth of focus the same as that of the projection optical system used for the position control, whereby the manufacturing operation becomes complex due to the laborious work. However, when a projection optical system having an average optical characteristic selected from a plurality of the projection optical systems is used as the reference projection optical system, it is no longer necessary to prepare a projection optical system having a particular optical characteristic, thereby improving manufacturing efficiency of the projection optical system, whereby the manufacture of the projector is performed easily and the efficiency of the manufacture is greatly improved.

According to a second invention of the present application, a method for controlling the position of a light modulation device is provided, which can use a position-control device for controlling the position of the light modulation device, the position-control device being used in the manufacture of an optical unit including a plurality of the light modulation devices and a combining optical system for combining the light modulated by each light modulation device, the position-control device projecting the light combined by the combining optical system to form a projection image displayed on a screen via a projection optical system and detecting data of the projection image displayed on the screen by at least one detecting device, thereby controlling the positions of the light modulation devices. The method can include controlling an initial position of each light modulation device such that the light modulation device is moved so that the position of the optical center of the light modulation device coincides with a reference position which has been set in advance, and lighting a light source for generating light to be applied to the light modulation devices. The method can further include controlling the position of the detecting device such that the detecting device is moved along the screen in accordance with the data of the projection image projected on the screen with the light being lighted in the step of lighting the light source; controlling the focus of the detecting device, and controlling the positions of the light modulation devices after controlling the focus of the detecting device in the focus controlling step.

According to the invention, since the detecting device is moved in accordance with the data of the projection image before the position of the light modulation device is controlled, the time for moving the detecting device can be reduced compared with a case in which the detecting device is moved when controlling the position of the light modulation device. Accordingly, the time required for the position-control operation is reduced and the position-control operation can be easily performed.

According to a third invention of the present application, a method for controlling the position of a light modulation device is provided, which can use a position-control device that controls the position of the light modulation device, the position-control device being used in the manufacture of an optical unit including a plurality of the light modulation devices and a combining optical system for combining the light modulated by each light modulation device, in which the position-control device projects the light combined by the combining optical system to form a projection image. The position-control device can include a reference projection optical system having a predetermined optical characteristic and being built in the position-control device so as to be commonly used, and at least one detecting device for detecting data of the projection image displayed on a screen via the reference projection optical system. The method can include controlling an initial position of each light modulation device such that the light modulation device is moved so that the position of the optical center of the light modulation device coincides with a reference position which has been set in advance, automatically controlling the position of the detecting device such that the detecting device is automatically moved along the screen in accordance with the position of the optical axis of the reference projection optical system, which has been set in advance, lighting a light source for generating light to be applied to the light modulation devices, and controlling the positions of the light modulation devices after controlling the position of the detecting device in the step of automatically controlling the position of the detecting device.

According to the invention, the detecting device is moved in accordance with the position of the optical axis of the reference projection optical system set in advance, whereby the detecting device can be moved without display of the projection image on the screen. Accordingly, it is not necessary to light the light source. With this arrangement, the detecting device can be easily moved, and the position-control operation can be easily performed.

According to a fourth invention of the present application, an initial-position-controlling jig can be in the position-controlling method described above, for setting the reference position of the light modulation device. The position controlling jig can include a dummy combining optical system, as a dummy of the combining optical system, provided with holes in a side face of the dummy combining optical system, and a dummy light-modulation-device, as a dummy of the light modulation device, provided with insertion terminals to be inserted into the holes.

In this case, the light modulation device is preferably moved by a position-control mechanism which moves the light modulation device in accordance with the data detected by the detecting device.

The position-control for the position-control mechanism can be performed by disposing the dummy combining optical system at a predetermined position, and moving the position-control mechanism mounted with the dummy light modulation device so as to insert the insertion terminals of the dummy light modulation device into the holes of the dummy combining optical system.

According to the invention, a plurality of the types of, for example, position-controlling jigs are prepared according to the corresponding types of the projector, and the positions of the position-control mechanisms corresponding to the types of the projector are registered in advance in the position-control device, whereby it is not necessary to control the position of the position-control mechanism when the position of the light modulation device is controlled and the position-control mechanism must be simply moved to the position registered in advance when controlling the position of the light modulation device. Therefore, the position-control operation is easily performed.

According to a fifth invention of the present application, an initial-position-controlling jig used in the position-controlling method described above, for setting the reference position of the light modulation device, can include a rectangular parallelepiped glass body as a dummy of the combining optical system. The glass body is provided at the light-incident end face with a reference-position-indicating mark for indicating on the screen the designed reference position of the detecting device.

According to the invention, when light is applied to the glass body and the light is displayed on the screen via a projection optical system, the reference-position-indicating mark provided on the glass body is displayed as a silhouette on the screen. In this state, the detecting device can be easily disposed at the designed reference position by moving the detecting device to the silhouette, whereby the position-control operation can be easily performed.

BRIEF DESCRIPTION OF THE DRAWINGS

The invention will be describe with reference to the accompanying drawings, in which like elements are referred to with like numbers, and in which:

FIG. 1 is a schematic view showing the configuration of a projector including an optical unit as an object to be controlled by a method for controlling the position of a light modulation device, according to an embodiment of the present invention;

FIG. 2 is an exploded perspective view of the optical unit as an object to be controlled by the method according to the embodiment;

FIG. 3 is a side view showing the configuration of the position-control device for a light modulation device, according to the embodiment;

FIG. 4 is a plan view showing the configuration of the position-control device for a light modulation device, according to the embodiment;

FIG. 5 is a side view showing a position-control mechanism forming a control-device body, according to the embodiment;

FIG. 6 includes front views showing disposition of light sources included in a light source unit, according to the embodiment;

FIG. 7 is a perspective view showing the configuration of a clamping jig forming the control-device body, according to the embodiment;

FIG. 8 is a side view showing the configuration of the clamping jig, according to the embodiment;

FIG. 9 is a rear view showing the configuration of a transmission screen, according to the embodiment;

FIG. 10 is an exemplary block diagram showing the control and image processing of the position-control device for a light modulation device, according to the embodiment;

FIG. 11 is an illustration of a displayed view in performing a program for controlling the position-control device for a light modulation device, according to the embodiment;

FIG. 12 is a flowchart showing the steps of focus and alignment control, according to the embodiment;

FIG. 13 is a schematic perspective view showing a method for setting a reference position of a liquid crystal panel, according to the embodiment;

FIG. 14 includes illustrations showing a method for setting the positions of cameras, according to the embodiment;

FIG. 15 is a schematic view showing a method for setting a reference pattern, according to the embodiment; and FIG. 16 is a flowchart showing the steps of focus and alignment control of the projector, according to the embodiment.

DETAILED DESCRIPTION OF PREFERRED EMBODIMENTS

FIG. 1 shows a projector 100 provided with an optical unit, which is an object to be controlled by a position-control device according to an embodiment of the present invention for a light modulation device, including a plurality of light modulation devices and a color-combining optical system. The projector 100 is also provided with a projection optical system. As shown, the projector 100 can include an integrator illumination optical system 110, a color-decomposing optical system 120, a relay optical system 130, an electro-optical device 140, a crossed dichroic prism 150 as a color-combining optical system, and a projection lens 160 as a projection optical system.

The integrator illumination optical system 110 includes a light source device 111 including a light source lamp 111A and a reflector 111B, a first lens array 113, a second lens array 115, a reflective mirror 117, and a superimposing lens 119. Light radiated by the light source lamp 111A is directed in an emission direction by the reflector 111B. The light is split into a plurality of split light by the first lens array 113. The plurality of split light beams is emitted in the emission direction bent by 90 degrees by the reflective mirror 117, and forms images in the vicinity of the second lens array 115. The split light beams emitted from the second lens array 115 are applied to the superimposing lens 119 disposed at the subsequent stage such that the central axis (principal light beam) of the split light beams is perpendicular to the incident surface of the superimposing lens 119. The plurality of split light beams emitted from the superimposing lens 119 are superimposed on three liquid crystal panels 141R, 141G, and 141B forming the electro-optical device 140 which is described in greater detail below.

The color-decomposing optical system 120 can include two dichroic mirrors 121 and 122 and a reflective mirror 123. The mirrors 121, 122, and 123 can function to decompose the plurality of split light beams emitted from the integrator illumination optical system 110 into three colors which are red, green, and blue.

The relay optical system 130 can include an incident-side lens 131, a relay lens 133, and reflective mirrors 135 and 137. The relay optical system 130 functions to guide one of the colored light, for example, the blue light B decomposed by the color-decomposing optical system 120 to the liquid crystal panel 141B.

The electro-optical device 140 can include the three liquid crystal panels 141R, 141G, and 141B as the light modulation devices. The liquid crystal panels 141R, 141G, and 141B use, for example, polysilicon TFTs as switching elements. The colored light decomposed by the color-decomposing optical system 120 is modulated by the three liquid crystal panels 141R, 141G, and 141B and forms an optical image in accordance with image data.

The crossed dichroic prism 150 can serve as the color-combining optical system to form a color image by combining the colored light modulated and emitted by the three liquid crystal panels 141R, 141G, and 141B. The crossed dichroic prism 150 can be formed with a dielectric multi-layered film which reflects the red light and another dielectric multi-layered film which reflects the blue light, the dielectric multi-layered films being disposed substantially in the letter X along the interfaces between four right-angle prisms, whereby the three colored light beams are combined by the dielectric multi-layered films. The color image combined by the crossed dichroic prism 150 is emitted through the projection lens 160 and is projected on a screen.

The projector 100 is provided with the electro-optical device 140 and the crossed dichroic prism 150 integrated with each other as an optical unit 170. That is, the three liquid crystal panels 141R, 141G, and 141B which form the electro-optical device 140 are disposed so as to enclose the crossed dichroic prism 150 at three sides thereof, as shown in FIG. 2.

Each of the liquid crystal panels 141R, 141G, and 141B is fixed to the crossed dichroic prism 150 by a so-called POP (panel on prism) structure which is fixed to the crossed dichroic prism 150 by bonding at a light-incident end face 151 thereof and in which the liquid crystal panel 141R, 141G, or 141B is received in a supporting frame 143 and pins 145 made of a transparent resin are inserted into respective holes 143A formed in the supporting frame 143 at the four comers thereof together with an ultraviolet-curing adhesive which is a photo-curing adhesive. The supporting frames 143 for the liquid crystal panels 141R, 141G, and 141B are each provided with a rectangular aperture 143b. Each of the liquid crystal panels 141R, 141G, and 141B is exposed at the aperture 143B, and the exposed part becomes an image-forming region. The colored light R, G, and B is introduced to these parts of the liquid crystal panels 141R, 141G, and 141B, respectively, whereby an optical image is formed in accordance with image data.

In the optical unit 170 which uses the POP structure, when the liquid crystal panels 141R, 141G, and 141B are fixed to the crossed dichroic prism 150 by bonding, the focus control, the alignment control, and the fixing operation of each of the liquid crystal panels 141R, 141G, and 141B must be performed simultaneously (i.e., within approximately 8 minutes). The assembly is generally performed in accordance with the following processes.

A first liquid crystal panel, for example, the liquid crystal panel 141G is fixed to the crossed dichroic prism 150 by bonding. Firstly, the pins 145 applied with an ultraviolet-curing adhesive at ends thereof are inserted into the respective holes 143A of the supporting frame 143. Then, the ends of the pins 145 are brought into contact with the light-incident end face 151 of the crossed dichroic prism 150.

Light is introduced to the image-forming region of the liquid crystal panel 141G, and the focus and alignment control of the liquid crystal panel 141G is performed by controlling the position of the liquid crystal panel 141G in directions perpendicular to and along the light-incident end face 151 and the rotational position of the liquid crystal panel 141G with respect to the light-incident end face 151 while confirming a projection image displayed on a screen via the projection lens 160. When properly focused and aligned, ultraviolet light is applied to the pins 145 from the base ends thereof, thereby completely curing the ultraviolet-curing adhesive.

The other liquid crystal panels 141R and 141B are affixed by bonding in the same manner as in the case described above. However, when controlling, the pixel positions in the image-forming region of the liquid crystal panel 141G which has been affixed are considered. That is, the positions of the liquid crystal panels 141R and 141B are controlled, with reference to the pixel positions of the liquid crystal panel 141G which has been affixed, in a direction along the light-incident end face 151 and the rotational direction with respect thereto.

Therefore, a position-control device which controls focus and alignment in relation between the liquid crystal panels 141R, 141G, and 141B is required when the optical unit 171 provided with such a POP structure is manufactured.

In FIGS. 3 and 4, a position-control device 2 which controls focus and alignment in relation between the liquid crystal panels 141R, 141G, and 141B of the optical unit 170 is shown. The position-control device 2 including a control-device body 30 and a screen unit 50 can be placed in a darkroom 20. The darkroom 20 is provided with side plates 21 and a top plate 22 which enclose the screen unit 50, and a curtain 23 which encloses the control-device body 30. The focus and alignment control of the optical unit 170 is performed in the darkroom 20.

The control-device body 30 is provided with three 6-axial-position-control units 31 as a position-control mechanism, a clamping jig 33 for supporting and affixing the optical unit 170 as an object to be controlled, and a mounting platform 35 for mounting the three 6-axial-position-control units 31 and the clamping jig 33. Mounted on the lower portion of the mounting platform 35 are a computer 70 (described below) as a processor for controlling the control-device body 30 and the screen unit 50, a control light source which applies light for control when controlling the optical unit 170 as an object to be controlled, and a fixing ultraviolet light source for fixing the liquid crystal panels 141R, 141G, and 141B of the optical unit 170 to the crossed dichroic prism 150 by curing an ultraviolet-curing adhesive. The computer 70, the control light source, and the ultraviolet light source are not shown in FIG. 3.

The 6-axial-position-control units 31 control the positions of the liquid crystal panels 141R, 141G, and 141B with respect to the corresponding light-incident end faces 151 of the crossed dichroic prism 150. In FIG. 5, each 6-axial-position-control unit 31 includes a plan-position-control member 311 as a position-control member for a modulation device, disposed movable along rails 351 of the mounting platform 35, an in-plane-rotational-position-control member 313 disposed at an end of the plan-position-control member 311, an out-of-plane-position-control member 315 disposed at an end of the in-plane-position-control member 313, and a liquid-crystal-panel-clamping member 317 disposed at an end of the out-of-plane-position-control member 315.

The plan-position-control member 311 controls the position thereof in directions perpendicular to and along the light-incident end face 151 of the crossed dichroic prism 150. The plan-position-control member 311 includes a base part 311A movably disposed on the mounting platform 35, a leg part 311B standing from the base part 311A, and a connection part 311C disposed at an upper end of the leg part 311B and connected to the in-plane-rotational-position-control member 313. The base part 311A moves in the z-axis direction (in the horizontal direction in FIG. 5) by being driven by a driving mechanism such as a motor (not shown). The leg part 311B moves in the x-axis direction (in a direction perpendicular to the sheet of FIG. 5) with respect to the base part 311A by being driven by a driving mechanism such as a motor disposed at the side (not shown). The connection part 311C moves in the y-axis direction (in the vertical direction in FIG. 5) with respect to the leg part 311B by being driven by a driving mechanism such as a motor (not shown).

The in-plane-rotational-position-control member 313 controls the rotational position in the in-plane-direction of each of the liquid crystal panels 141R, 141G, and 141B with respect to the light-incident end face 151 of the crossed dichroic prism 150. The in-plane-rotational-position-control member 313 includes a cylindrical base part 313A fixed to the in-plane-rotational-position-control member 313 at an end thereof and a rotation-control member 313B disposed rotatable in the circumferential direction of the base part 313A. The rotational position in the in-plane direction of each of the liquid crystal panels 141R, 141G, and 141B with respect to the light-incident end face 151 can be accurately controlled by controlling the rotational position of the rotation-control member 313B.

The out-of-plane-rotational-position-control member 315 controls the rotational position in the out-of-plane direction of each of the liquid crystal panels 141R, 141G, and 141B with respect to the light-incident end face 151 of the crossed dichroic prism 150. The out-of-plane-rotational-position-control member 315 is fixed to the in-plane-rotational-position-control member 313 at an end thereof, and includes a base part 315A provided with a concave face formed in an arc in the horizontal direction at an end of the base part 315A, a first control part 315B slidingly disposed on the concave face of the base part 315A along the arc thereof and having a concave face formed at an end thereof in an arc in the vertical direction, and a second control part 315C slidingly disposed on the concave face of the first control part 315B along the arc thereof. When a motor (not shown) disposed at the side of the base part 315A is rotation-driven, the first control part 315B moves slidingly, and when a motor (not shown) disposed at the upper part of the first control part 315B is rotation-driven, the second control part 315C moves slidingly, whereby the rotational position in the out-of-plane direction of each of the liquid crystal panels 141R, 141G, and 141B with respect to the light-incident end face 151 is accurately controlled.

The liquid-crystal-panel-clamping members 317 support the liquid crystal panels 141R, 141G, and 141B which are objects to be controlled. The liquid-crystal-panel-clamping members 317 includes a fixed clamping tab 317A fixed to the second control part 315C at an end thereof, a movable clamping tab 317B slidingly disposed at the end of the second control part 315C, and an actuator 317C for actuating the movable clamping tab 317B. By actuating the movable clamping tab 317B by using the actuator 317C, each liquid crystal panel 141R, 141G, or 141B can be clamped. By changing the initial sliding position of the movable clamping tab 317B, each liquid crystal panel 141R, 141G, or 141B having a different size can be clamped.

A light source unit 37 is disposed between the fixed clamping tab 317A and the movable clamping tab 317 of each liquid-crystal-panel-clamping member 317.

Each light source unit 37 supplies light for control and light for fixing to the liquid crystal panel 141R, 141G, or 141B. The light source unit 37 includes a unit body 371 which comes into contact with the liquid crystal panel 141R, 141G, or 141B and a plurality of optical fibers 372 as radiation that supply the unit body 371 with light for control and light for fixing. Ends of the optical fibers 372 are connected to a control-light-source device and a fixing-light-source device which are disposed under the mounting platform 35. As shown in FIG. 6(A), the unit body 371 is provided with control light sources 371A at a surface to come into contact with the liquid crystal panel 141R, 141G, or 141B and at respective corners of the rectangular image-forming region of the liquid crystal panel 141R, 141G, or 141B, and fixing light sources 371B disposed outside the image-forming region and coming into contact with the pins 145 made of a transparent resin at the base parts of the pins 145. The unit body 371 which comes into contact with the liquid crystal panel 141R, 141G, or 141B may be one which is provided with the fixing-light sources 371C along the outer sides of the control-light sources 371A, as shown in FIG. 6(B), or may be one of which the fixing-light sources 371B are differently disposed, as shown in FIG. 6(C). The type of the unit bodies 371 is properly selected according to the type of the liquid crystal panels 141R, 141G, and 141B, whereby the unit bodies 371 can be used for the liquid crystal panels having different fixing structures.

In FIGS. 7 and 8, the clamping jig 33 can include a base plate 331 fixed to the mounting platform 35, a plurality of legs 333 standing on the base plate 331, and a setting plate 335 disposed on the legs 333 and mounted with the optical unit 170 as an object to be controlled and the projection lens 160.

The base plate 331 is provided with relative-position-control members 337 each protruding toward the outside of the base plate 331. The relative-position-control members 337 control the relative position of the optical unit 170 fixed to the clamping jig 33 with respect to the 6-axial-position-control units 31. Each relative-position-control member 337 extends to the outside of the base plate 331 and includes a protruding part 337A provided with a threaded hole at the end of the protruding part 337A and a controlling screw 337B for coupling with the threaded hole of the protruding part 337A. The controlling screw 337B protrudes to the outside of the protruding part 337A at an end of the controlling screw 337B. The end of the controlling screw 337B comes into contact with an end face of the rail 351 on which the 6-axial-position-control unit 31 moves, as described above. The position of the 6-axial-position-control unit 31 with respect to the clamping jig 33 varies with the change of the coupling position of the controlling screw 337B, whereby each 6-axial-position-control unit 31 can be disposed at a proper position according to the type of the optical unit 170 mounted to the clamping jig 33. According to the present embodiment, one relative-position-control member 337 is disposed protruding in the light-emission direction of the optical unit 170, that is, in the z-axis direction, and two relative-position-control members 337 are disposed in a direction perpendicular to the z-axis direction, that is, in the x-axis direction (three relative-position-control members altogether).

The setting plate 335 is provided thereon with a rectangular-plate-shaped mounting member 339 for mounting a reference projection lens 345 (described below) and the crossed dichroic prism 150 which forms the optical unit 170.

The mounting member 339 is provided thereon with a lens-supporting member 341 for supporting the reference projection lens 345 and a unit-mounting member 342 for mounting and affixing the crossed dichroic prism 150.

The lens-supporting member 341 is formed as a movable platform which is movable with respect to the mounting member 339 in the z-axis direction (the horizontal direction in FIG. 8) and in the x-axis direction (a direction perpendicular to the sheet of FIG. 8). The lens-supporting member 341 is detachably mounted with the reference projection lens 345 as a reference projection optical system having a predetermined optical characteristic, other than the projection lens 160 which is a component to be built in the projector 100. In other words, the position-control device 2 is provided therein with the reference projection lens 345 having the predetermined optical characteristic and to be commonly used, which projects the light combined by the crossed dichroic prism 150 and forms a projection image.

The reference projection lens 345 has an average optical characteristic selected from the optical characteristics of a plurality of projection lenses. In this case, the optical characteristic can include a depth of focus, individual focal distances of the projection optical systems, a chromatic aberration, variations in the optical axes, trapezoidal distortion, and the like. The average optical characteristic is computed from the optical characteristic of each projection lens, and a projection lens having an optical characteristic similar to the computed optical characteristic is used as the reference projection lens 345.

The unit-mounting member 342 includes a rectangular parallelepiped prism-mounting member 343 on which the crossed dichroic prism 150 is mounted, and a pressing member 344 (see FIG. 8) disposed above the prism-mounting member 343, for clamping and affixing the crossed dichroic prism 150.

When mounting the crossed dichroic prism 150 as an object to be controlled, the crossed dichroic prism 150 mounted on the prism-mounting member 343 is clamped and affixed by moving the pressing member 344.

As shown in FIGS. 3 and 4, the screen unit 50 includes a mounting platform 51 disposed at a given distance from the control-device body 30, a transmission screen 53 as a projection display for the optical unit 170 as an object to be controlled, the transmission screen 53 being disposed on the mounting platform 51, CCD cameras 55 as detection devices disposed at the rear side of the transmission screen 53, and movement mechanisms 57 for moving the CCD cameras 55 along the surface of the transmission screen 53.

Three rails 511 are disposed extending in the projection direction of the optical unit 170 on the mounting platform 51. The transmission screen 53 is movable on the three rails 511, whereby the relative distance between the control-device body 30 and the transmission screen 53 can be controlled. The transmission screen 53 is moved by a servo-control mechanism disposed inside the mounting platform 51 or manually (not shown).

In FIG. 9, the transmission screen 53 includes a rectangular frame 531 disposed at the periphery of the transmission screen 53, and a screen body 533 disposed at the inside of the frame 531. The screen body 533 can be made by evenly spreading optical beads on an opaque resin layer. When light is applied to a side at which the optical beads are disposed, the optical beads serve as lenses and emit the light toward the rear side of the screen body 533.

Each CCD camera 55 as a detection device is an area sensor including a charge coupled device as an imaging device, that detects projection image formed at the rear side of the screen body 533 and outputs an electric signal. According to the present embodiment, four CCD cameras 55 are disposed in the vicinity of the four corners, respectively, of the rectangular projection image displayed on the transmission screen 53, via the movement mechanisms 57, respectively. The CCD cameras 55 are each provided with a zooming and focusing mechanism so as to accurately detect the projection image. The zooming and focusing mechanism can be operated by remote control.

Each movement mechanism 57 can include a base member 571 disposed in the vicinity of one of the four corners of the frame 531, a shaft 573 capable of sliding on the base member 571 in the x-axis direction (the horizontal direction in FIG. 9), and a camera-mounting member 575 which is mounted to the shaft 573 so as to be capable of sliding thereon in the y-axis direction (the vertical direction in FIG. 9) and which mounts the CCD camera 55. Each camera-mounting member 575 moves in the x-axis direction and the y-axis direction by being driven by a servo-control mechanism disposed inside the mounting platform 51.

The control-device body 30 and the screen unit 50 described above can be electrically connected to the computer 70, as shown in an exemplary block diagram in FIG. 10. The computer 70 provided with a CPU and a storage controls the operation of the control-device body 30 and the servo-control mechanism of the screen unit 50, and performs image-processing of the projection image captured by the CCD cameras 55.

A program called by the computer 70 displays a viewing area 71 shown in FIG. 11 in a display, and performs focus and alignment control according to the data displayed in the viewing area 71. The viewing area 71 can include an image-display view 72 for directly displaying images sent from the CCD cameras 55, an image-process view 73 for performing image-processing of image signals sent from the CCD cameras 55, and an axial-movement-amount-display view 74 for displaying the amount of control along each of the 6 axes measured by 6-axial-position-control unit 31, as a result of the image processing.

The focus and alignment control of the optical unit 170 as an object to be controlled includes a type-registration operation in which a control condition is set in accordance with the type of the optical unit 170, and a control operation in which an actual control operation is performed after the type-registration operation, with reference to the registered control condition. The type-registration operation and the control operation are described in greater detail below.

The type-registration operation is performed according to the flowchart shown in FIG. 12, by using a sample of the optical unit 170 of which the focus position and the alignment position are set in advance.

The type-data previously set in a program expanded on the computer 70 are cleared (step S11). The view is set such that new type-data can be registered.

Inputs of setting for image processing by using the program are performed (step S12). In other words, the distances between each CCD camera 55 are set. The distance between each CCD camera 55 is set by computing and considering the positions of the transmission screen 53 at which the four corners of the image-forming region of each of the liquid crystal panels 141R, 141G, and 141B are reflected.

When the inputs of setting for image processing are completed, a file name to be assigned to the type-data is set, and the set distances are stored as the type-data in the storage under the set file name (step S13).

The clamping jig 33 is selected in accordance with the type of the optical unit 170 as an object to be controlled, and the clamping jig 33 is set in a predetermined position on the mounting platform 35 (step S14).

The reference projection lens 345 is mounted to the lens-supporting member 341, and is affixed with the optical axis thereof being aligned. The aligned optical axis is registered in the file (step S15). After the optical axis is once aligned, it is not necessary to align the optical axis every time the positions of the liquid crystal panels 141R, 141G, and 141B are controlled, unless the type of the optical unit 170 changes.

An initial position of control of the 6-axial-position-control unit 31 for controlling the position of the liquid crystal panel 141G is registered in the file. The initial position of control is set to a designed central part (as a reference position) of the image-forming region of the liquid crystal panel 141G (step S16).

The reference position of the liquid crystal panel 141G is set in advance by using an initial-position-controlling jig 400 which includes a metallic dummy prism 401 as a dummy of the crossed dichroic prism 150 provided with holes 402 formed at a side face of the dummy prism 401 and a metallic dummy liquid crystal panel 406 as a dummy of the liquid crystal panel 141G provided with insertion terminals 407 to be inserted into the holes 402 of the dummy prism 401.

Specifically, the dummy prism 401 is disposed at a predetermined position of the prism-mounting member 343 and is affixed by being clamped by the pressing member 344. The 6-axial-position-control unit 31 mounted with the dummy liquid crystal panel 406 is moved so that the insertion terminals 407 of the dummy liquid crystal panel 406 are inserted into the holes 402 of the dummy prism 401, whereby the reference position of the liquid crystal panel 141G, the initial position of control of the 6-axial-position-control unit 31 can be set. The initial position of control to be registered is an important position which determines the amount of 6-axial movement when controlling the focus and alignment. When the initial position of control is set in the vicinity of the designed position, it is not necessary to largely move the 6-axial-position-control unit 31, whereby errors such as CT reduction and incorrect control are suppressed.

A plurality of the initial-position-controlling jigs prepared according to the types of the projector 100 set the positions and register the set positions in each file.

After the initial position of control of the 6-axial-position-control unit 31 is set, the positions of the CCD cameras 55 are set (step S17). The positions of the CCD cameras 55 are set by using an initial-position-controlling jig 410 provided with a rectangular parallelepiped glass body 411 as a dummy of the crossed dichroic prism 150, as shown in FIG. 14(A).

As shown in FIG. 14(A), the initial-position-controlling jig 410 can include four reference-position-indicating marks 412 for indicating the designed reference positions of the CCD cameras 55 with respect to the screen 53 that are formed on the glass body 411 at a light-incident end face thereof. The silk-screen position of the reference-position-indicating marks 412 coincides with the position of a reference pattern BP (see FIG. 15) of the reference projection lens 345.

The glass body 411 is mounted on the prism-mounting member 343, light is applied to the glass body 411, the light is displayed on the screen 53 via the reference projection lens 345, and silhouettes 413 of the reference-position-indicating marks 412 provided on the glass body 411 are displayed on the screen 53. In this state, by moving the CCD cameras 55 to the positions of the silhouettes 413, the CCD cameras 55 are disposed in the designed reference positions.

When the positions of the CCD cameras 55 are set, the type number of the optical unit 170 and the positions of the CCD cameras 55 for the optical unit 170 of this type number are registered as type-data in the file (step S18).

The size of each pixel of the CCD camera 55 is set (step S19), and the set value is registered in the file (step S20).

Lastly, a reference pattern for alignment is registered (step S21). In other words, as shown in FIG. 15, a substantially square region which includes a region provided with pixels G1 and another region G2 not provided with the pixels G1 is formed as a reference pattern BP, the ratio of the length of a side member between the region provided with pixels G1 and the other region G2 not provided with the pixels G1 being substantially two to one (the ratio of the area being four to five). The shape of the pattern BP and the position thereof in the projection-image region are registered. Since the reference pattern BP must be set corresponding to each of the four corners of each liquid crystal panel 141R, 141G, or 141B, twelve (4×3) reference patterns and twelve (4×3) retrial patterns are registered.

When all the reference patterns are registered, the registered data are finally registered in the file as type-data (step S22).

The control operation can be performed according to the flowchart shown in FIG. 16.

The crossed dichroic prism 150 is fixed to the clamping jig 33 which is disposed at a predetermined position (step S1). The type-data corresponding to the optical unit 170 to be controlled are called among the type-data registered in the preceding type-registration operation into a program expanded by the computer 70 (step S2).

When the type-data are called in the program, the initial position of control (the reference position of the liquid crystal panel 141G) of the 6-axial-position-control unit 31 recorded in the type-data is outputted by the computer. The 6-axial-position-control unit 31 is moved so that the position of the optical center of the liquid crystal panel 141G coincides with the reference position set in advance, whereby the initial-position-control of the liquid crystal panel 141G is performed (step S23).

The control-light sources 371A of the light source unit 37 included in the 6-axial-position-control unit 31 emit light (step S24), and forms projection images of the four corners of the liquid crystal panel 141G on the transmission screen 53.

The movement mechanism 57 is operated by a servo mechanism disposed inside the mounting platform 51 in accordance with the data of the projection image projected on the screen 53, whereby the CCD cameras 55 are moved along the transmission screen 53 to predetermined positions thereof, respectively, that is, to the projected four corners, respectively, of the liquid crystal panel 141G, and the CCD cameras are focused (step S25). The data of the projection image projected on the screen 53 are data on the positions which were registered in the file when setting the positions of the CCD cameras 55.

After completing the above preparation, the 6-axial-position-control unit 31 starts focus and alignment control. According to the present embodiment, firstly, the focus and alignment control for the liquid crystal panel 141G disposed at the opposite side of the projection lens 160 with the crossed dichroic prism 150 therebetween is performed, and then, the focus and alignment control for the liquid crystal panels 141R and 141B is performed.

In the viewing area 71 of the program, a data-clear operation is performed and STAGE 1 representing the 6-axial-position-control unit which clamps the liquid crystal panel 141G is selected (step S26), whereby control of the liquid crystal panel 141G can be performed.

Each CCD camera 55 captures the projection image and outputs an image signal converted from the captured image to the computer 70 (step 27). The images captured by the CCD cameras 55 are displayed in the image-display view 72 of the viewing area 71 in the display of the computer 70, and measured data of STAGE 1 after image-processing are displayed in the image-process view 73 (step S28).

When pressing a "measurement" button in the image-process view 73 in this state, the positions of the four corners of the projected liquid crystal panel 141G are measured, and the amount of movement along each axis of the 6-axial-position-control unit 31 is displayed in the axial-movement-amount-display view 74 (step S29). That is, a region of the image-process view 73 corresponding to the reference pattern is detected, the position of the detected reference pattern in the view is determined, the variation of the determined result from the position registered in the type-data-registration operation is computed, the result of the computation is displayed in the axial-movement-amount-display view 74 as the amount of movement along each axis.

The plan position, in-plane rotational position, and out-of-plane rotational position of the liquid crystal panel 141G are controlled by dialing a control dial of each axis of the 6-axial-position-control unit 31 in accordance with the indicated values of the amount of movement of the axes displayed in the axial-movement-amount-display view 74. The control operation of each axis may be automated by substituting a servo motor or the like for manual dialing (step S30). When once completing the control, the "measurement" button is again pressed so as to compute the amount of movement along each axis (step S31), and the control operation is repeated until the amount of movement along all the axes becomes substantially zero (step S32).

When the focus and alignment control of the liquid crystal panel 141G is completed, the data of the control operation are stored in the storage (step S33), and the liquid crystal panel 141G is affixed by emitting an ultraviolet from the fixing light sources 371B of the light source unit 37 (step S34).

After the liquid crystal panel 141G is affixed, the clamping tabs 317A and 317B of the liquid-crystal-panel-clamping member 317 are released, and the positions are again measured (step S35). Reference values are obtained by this measurement of the positions, which are used when the position control of the other liquid crystal panels 141R and 141B is performed.

When the liquid crystal panel 141G is affixed, the focus and alignment control of the liquid crystal panels 141R and 141B is performed. For that purpose, STAGEs 2 and 3 which represent the 6-axial-position-control units 31 for clamping the liquid crystal panels 141R and 141B, respectively, are prepared (step S36), that is, reference position data for STAGEs 2 and 3 are set in accordance with the reference values for STAGE 1 obtained in step S33.

The focus and alignment control of the liquid crystal panels 141R and 141B is performed in the same manner as in the liquid crystal panel 141G. When completing controlling, the liquid crystal panels 141R and 141B are affixed in the same manner as in the liquid crystal panel 141G (step S37).

According to the present embodiment described above, advantages are offered, as described below.

The reference projection lens 345, which is capable of being commonly used, is built in the position-control device 2. Therefore, if the position of the optical axis is aligned once when the reference projection lens 345 was built in, it is no longer necessary to align the optical axes every time the positions of the liquid crystal panels 141R, 141G, and 141B are controlled, in which the replacement of the liquid crystal panels 141R, 141G, and 141B and the crossed dichroic prism 150 is only required, whereby the position-control operation can be easily performed.

Since the position of the optical axis of the reference projection lens 345 is fixed, the positions of the CCD cameras 55 may be fixed after being set once, whereby the position-control operation can be easily performed.

The reference projection lens 345 has an average optical characteristic selected from those of a plurality of projection lenses. Therefore, it is not necessary to prepare a projection lens which has a particular optical characteristic, thereby improving production efficiency of the projection lens, whereby the manufacture of the projector 100 becomes easy and the operation efficiency is improved.

The CCD cameras 55 are moved in accordance with the data of the projection image before the position control of the liquid crystal panel 141G is performed. Therefore, the time for moving the CCD cameras 55 can be reduced compared with a case in which the CCD cameras 55 are moved when the position control of the liquid crystal panel 141G is performed, whereby the time for the position control can be reduced and the position-control operation can be easily performed.

A plurality of the types of the initial-position-controlling jig 400 including the dummy prism 401 and the dummy liquid crystal panel 406 are prepared according to the types of the projector 100 and the positions of the 6-axial-position-control units 31 corresponding to the types of the projector 100 are registered in a file in advance. Therefore, it is not necessary to control the positions of the 6-axial-position-control units 31 every time the positions of the liquid crystal panels 141R, 141G, and 141B are controlled, and the 6-axial-position-control units 31 are simply moved to the positions registered in advance, when the liquid crystal panels 141R, 141G, and 141B are position-controlled, whereby the position-control operation can be easily performed.

Light is applied to the dummy prism (glass body) 411, the light is displayed on the screen 53 via the reference projection lens 345, and the reference-position-indicating marks 412 provided on the dummy prism (glass body) 411 are displayed as the silhouettes 413 on the screen 53, whereby the CCD cameras 55 can be easily positioned at the designed reference positions by simply moving the CCD cameras 55 to the silhouettes 413. Therefore, the position-control operation can be easily performed.

It is to be understood that the present invention is not limited to the above-described embodiments. The present invention can include various other configurations without departing from the spirit and scope of the present invention.

For example, although in the above embodiments, the CCD cameras 55 are moved in accordance with the data of the projection image projected on the screen, the CCD cameras 55 may be automatically moved along the screen, for example, in accordance with the position of the optical axis of the reference projection lens, which is set in advance as data of information in a computer, whereby the CCD cameras 55 can be moved without display of the projection image on the screen. Therefore, it is not necessary to light the light source. With this arrangement, the CCD cameras 55 can be easily moved, and the position-control operation can be easily performed.

Although according to the above embodiments, the reference projection lens has an average optical characteristic, the present invention is not limited to those embodiments, and, for example, a projection lens having an optical characteristic appropriately set in accordance with the optical characteristic of the projector may be used as the reference projection lens.

As described above, the position-control operation can be easily performed by using the position-control device for a light modulation device, the method for controlling the position of the light modulation device, and the initial-position-controlling jig according to the present invention.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A position-control device for a light modulation device that is used in the manufacture of an optical unit, the optical unit having a plurality of the light modulation devices and a combining optical system for combining the light modulated by each light modulation device, the position-control device controls the positions of the light modulation devices, the position-control device comprising:

a reference projection optical system which projects the light combined by the combining optical system to form a projection image and has a predetermined optical characteristic, the reference projection optical system detachably mounted so as to be commonly used in the manufacture of optical units.

2. A position-control device for a light modulation device, according to claim 1, the reference projection optical system being selected from a plurality of projection optical systems and having an average optical characteristic.

3. A method for controlling the position of a light modulation device, which uses a position-control device that controls the position of the light modulation device, the position-control device being used in the manufacture of an optical unit having a plurality of the light modulation devices and a combining optical system that combines the light modulated by each light modulation device, the position-control device projecting the light combined by the combining optical system to form a projection image displayed on a screen via a projection optical system and detecting data of the projection image displayed on the screen by at least one detecting device, thereby controlling the positions of the light modulation devices, the method comprising:

controlling an initial position of each light modulation device such that the light modulation device is moved so that the position of the optical center of the light modulation device coincides with a predetermined reference position;

lighting a light source that generates light to be applied to the light modulation devices;

controlling the position of the detecting device such that the detecting device is moved along the screen in accordance with the data of the projection image projected on the screen with the light being lighted in the step of lighting the light source;

controlling a focus of the detecting device; and controlling the positions of the light modulation devices after controlling the focus of the detecting device in the focus controlling step.

4. A method for controlling the position of a light modulation device, which uses a position-control device that controls the position of the light modulation device, the position-control device being used in the manufacture of an optical unit having a plurality of the light modulation devices and a combining optical system that combines the light modulated by each light modulation device, the position-control device having a reference projection optical system which projects the light combined by the combining optical system to form a projection image and has a predetermined optical characteristic, the reference projection optical system being built in so as to be commonly used, and at least one detecting device that detects data of the projection image displayed on a screen via the reference projection optical system, the method comprising:

controlling an initial position of each light modulation device such that the light modulation device is moved so that the position of the optical center of the light modulation device coincides with a predetermined reference position;

automatically controlling the position of the detecting device such that the detecting device is automatically moved along the screen in accordance with the predetermined position of the optical axis of the reference projection optical system;

lighting a light source that generates light to be applied to the light modulation devices; and controlling the positions of the light modulation devices after controlling the position of the detecting device in the step of automatically controlling the position of the detecting device.

5. An initial-position-controlling jig used in the position-controlling method according to claim 3, that sets the reference position of the light modulation device, the initial-position-controlling jig comprising:

a dummy combining optical system, as a dummy of the combining optical system, provided with holes in a side face of the dummy combining optical system; and a dummy light-modulation-device, as a dummy of the light modulation device, provided with insertion terminals to be inserted into said holes of the dummy combining optical system.

6. An initial-position-controlling jig used in the position-controlling method according to claim 3, that sets the reference position of the light modulation device, the initial-position-controlling jig comprising:

a rectangular parallelepiped glass body as a dummy of the combining optical system, the glass body being provided at the light-incident end face with a reference-position-indicating mark that indicates on the screen a designed reference position of the detecting device.

7. An initial-position-controlling jig used in the position-controlling method according to claim 4, that sets the reference position of the light modulation device, the initial-position-controlling jig comprising:

a dummy combining optical system, as a dummy of the combining optical system, provided with holes in a side face of the dummy combining optical system; and a dummy light-modulation-device, as a dummy of the light modulation device, provided with insertion terminals to be inserted into said holes of the dummy combining optical system.

8. An initial-position-controlling jig used in the position-controlling method according to claim 4, that sets the reference position of the light modulation device, the initial-position-controlling jig comprising:

a rectangular parallelepiped glass body as a dummy of the combining optical system, the glass body being provided at the light-incident end face with a reference-position-indicating mark that indicates on the screen a designed reference position of the detecting device.

* * * * *